United States Patent
Onggosanusi et al.

(10) Patent No.: US 10,763,925 B2
(45) Date of Patent: Sep. 1, 2020

(54) METHOD AND APPARATUS FOR REDUCED FEEDBACK MIMO

(71) Applicant: Samsung Electronics Co., Ltd, Suwon-si (KR)

(72) Inventors: Eko Onggosanusi, Coppell, TX (US); Md. Saifur Rahman, Richardson, TX (US); Youngwoo Kwak, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 394 days.

(21) Appl. No.: 15/339,482

(22) Filed: Oct. 31, 2016

(65) Prior Publication Data

US 2017/0134082 A1    May 11, 2017

Related U.S. Application Data

(60) Provisional application No. 62/253,911, filed on Nov. 11, 2015, provisional application No. 62/288,180, (Continued)

(51) Int. Cl.
   *H04B 7/0456*    (2017.01)
   *H04B 7/06*    (2006.01)
   (Continued)

(52) U.S. Cl.
   CPC ......... *H04B 7/0478* (2013.01); *H04B 7/0469* (2013.01); *H04B 7/0486* (2013.01);
   (Continued)

(58) Field of Classification Search
   None
   See application file for complete search history.

(56) References Cited

U.S. PATENT DOCUMENTS

| | | | |
|---|---|---|---|
| 2013/0058295 A1* | 3/2013 | Ko | H04B 7/063 370/329 |
| 2013/0315192 A1 | 11/2013 | Seo | |
| 2015/0249511 A1* | 9/2015 | Chen | H04L 1/0026 370/252 |

FOREIGN PATENT DOCUMENTS

| | | |
|---|---|---|
| WO | 2015115706 A1 | 8/2015 |
| WO | 2017039394 A1 | 3/2017 |
| WO | 2017078497 A1 | 5/2017 |

OTHER PUBLICATIONS

Further details on Rel-13 CSI process configuration—3GPP TSG RAN WG1 (Oct. 5-9, 2015)—R1-155394 (Year: 2015).*

(Continued)

*Primary Examiner* — Peter Chen
*Assistant Examiner* — Jeff Banthrongsack

(57) ABSTRACT

Methods and apparatuses for CSI reporting mechanisms are provided. A user equipment (UE) includes a transceiver and a processor operably connected to the transceiver. The transceiver is configured to receive transmission scheme configuration information, codebook configuration information, and eMIMO-Type configuration information. The processor is configured to calculate, in response to receipt of configuration information that indicates an open-loop diversity operation, a first precoding matrix indicator (PMI) $i_1$ from a codebook. The codebook includes two PMIs $i_1$ and $i_2$ and is determined based on the codebook configuration information. The transceiver is further configured to report the first PMI $i_1$ by transmitting the first PMI $i_1$ on an uplink channel.

15 Claims, 10 Drawing Sheets

Related U.S. Application Data filed on Jan. 28, 2016, provisional application No. 62/312,222, filed on Mar. 23, 2016.

(51) Int. Cl.
*H04L 5/00* (2006.01)
*H04L 1/06* (2006.01)
*H04L 1/00* (2006.01)

(52) U.S. Cl.
CPC ............. *H04B 7/063* (2013.01); *H04B 7/065* (2013.01); *H04B 7/0617* (2013.01); *H04B 7/0626* (2013.01); *H04B 7/0632* (2013.01); *H04B 7/0639* (2013.01); *H04B 7/0647* (2013.01); *H04B 7/0689* (2013.01); *H04L 1/0001* (2013.01); *H04L 1/0026* (2013.01); *H04L 1/06* (2013.01); *H04L 5/0023* (2013.01); *H04B 7/0682* (2013.01)

(56) References Cited

OTHER PUBLICATIONS

Evolved Universal Terrestrial Radio Access (E-UTRA)—3GPP TS 36.213 V10.1.0 Apr. 2011 (Year: 2011).*
"Further Details on Rel-13 CSI Process Configuration," 3GPP TSG RAN WG1 Meeting #82bis, LG Electronics, R1-155394, Malmo, Sweden, Oct. 5-9, 2015, 6 pages.
"CSI Process and CSI-RS Resource Configuration," 3GPP TSG RAN WG1 Meeting #82bis, Nokia Networks, R1-155821, Malmo, Sweden, Oct. 5-9, 2015, 9 pages.
LTE; Evolved Universal Terrestrial Radio Access (E-UTRA); Physical Layer Procedures, (3GPP TS 36.213 Version 10.1.0 Release 10), ETSI TS 136 213, V10.1.0, Apr. 2011, 119 pages.
Foreign Communication From a Related Counterpart Application, PCT Application No. PCT/KR2016/012881, International Search Report dated Feb. 20, 2017, 5 pages.
Foreign Communication From a Related Counterpart Application, PCT Application No. PCT/KR2016/012881, Written Opinion dated Feb. 20, 2017, 7 pages.
3GPP TS 36.211 v12.4.0, (Dec. 2014) 3rd Generation Partnership Project; Technical Specification Group Radio Access Network; Evolved Universal Terrestrical Radio Access (E-UTRA); Physical channels and modulation (Release 12) Dec. 2014—124 pgs.
ETSI TS 136 212 V12.3.0 (Feb. 2015) LTE; Evolved Universal Terrestrial Radio Access (E-UTRA); Multiplexing and channel coding (3GPP TS 36.212 version 12.3.0 Release 12) Feb. 2015—91 Pgs.
3GPP TS 36.213 v12.4.0, (Dec. 2014) 3rd Generation Partnership Project; Technical Specification Group Radio Access Network; Evolved Universal Terrestrial Radio Access (E-UTRA) Physical Layer Procedures (Release 12) Dec. 2014—225 pgs.
3GPP TS 36.321 v12.4.0, (Dec. 2014) 3rd Generation Partnership Project; Technical Specification Group Radio Access Network; Evolved Universal Terrestrial Radio Access (E-UTRA) Medium Access Control (MAC) protocol specification (Release 12) Dec. 2014—60 pgs.
3GPP TS 36.331 v12.4.0, 3rd Generation Partnership Project; Technical Specification Group Radio Access Network; Evolved Universal Terrestrial Radio Access (E-UTRA); Radio Resource Control (RRC); Protocol Specification (Release 12) Dec. 2014—410 pgs.
Extended European Search Report regarding Application No. 16864560.4, dated Oct. 29, 2018, 9 pages.
AT&T, et al., "WF on class A and class B CSI reporting for Rel.13 EB/FD-MIMO", 3GPP TSG RAN WG1 Meeting #82bis, R1-156217, Oct. 2015, 10 pages.

* cited by examiner

METHOD AND APPARATUS FOR REDUCED FEEDBACK MIMO

CROSS-REFERENCE TO RELATED APPLICATIONS AND CLAIM OF PRIORITY

This application claims priority under 35 U.S.C. § 119(e) to:
U.S. Provisional Patent Application Ser. No. 62/253,911 filed Nov. 11, 2015;
U.S. Provisional Patent Application Ser. No. 62/288,180 filed Jan. 28, 2016; and
U.S. Provisional Patent Application Ser. No. 62/312,222 filed Mar. 23, 2016;
The above-identified provisional patent applications are hereby incorporated by reference in their entirety.

TECHNICAL FIELD

The present disclosure relates generally to transmission method and channel state information (CSI) reporting for multiple transmit antennas which includes two dimensional arrays. Such two dimensional arrays can be associated with a type of multiple-input multiple-output (MIMO) system often termed "full-dimension" MIMO (FD-MIMO) or massive MIMO or 3D-MIMO.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for CSI reporting.

In one embodiment, a user equipment (UE) is provided. The UE includes a transceiver and a processor operably connected to the transceiver. The transceiver is configured to receive transmission scheme configuration information, codebook configuration information, and eMIMO-Type configuration information. The processor is configured to calculate, in response to receipt of configuration information that indicates an open-loop diversity operation, a first precoding matrix indicator (PMI) $i_1$ from a codebook. The codebook includes two PMIs $i_1$ and $i_2$ and is determined based on the codebook configuration information. The transceiver is further configured to report the first PMI $i_1$ by transmitting the first PMI $i_1$ on an uplink channel.

In another embodiment, a base station (BS) is provided. The BS includes a processor and a transceiver operably connected to the processor. The processor is configured to generate configuration information to configure a UE with a transmission scheme, a codebook, and an eMIMO-Type. The transceiver configured to transmit, to the UE, the configuration information; transmit, to the UE, data with open-loop diversity; and receive a report including a first PMI i_1 on an uplink channel. The first PMI $i_1$ is calculated from the codebook that includes two PMIs $i_1$ and $i_2$, and is determined based on the configuration information for the codebook.

In another embodiment, a method for operating a UE is provided. The method includes receiving, by the UE, transmission scheme configuration information, codebook configuration information, and eMIMO-Type configuration information. The method also includes, in response to receipt of configuration information that indicates an open-loop diversity operation, calculating, by the UE, a first PMI $i_1$ from a codebook that is determined based on the codebook configuration information and includes two PMIs $i_1$ and $i_2$. The method also includes reporting the first PMI $i_1$ by transmitting the first PMI $i_1$ on an uplink channel.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
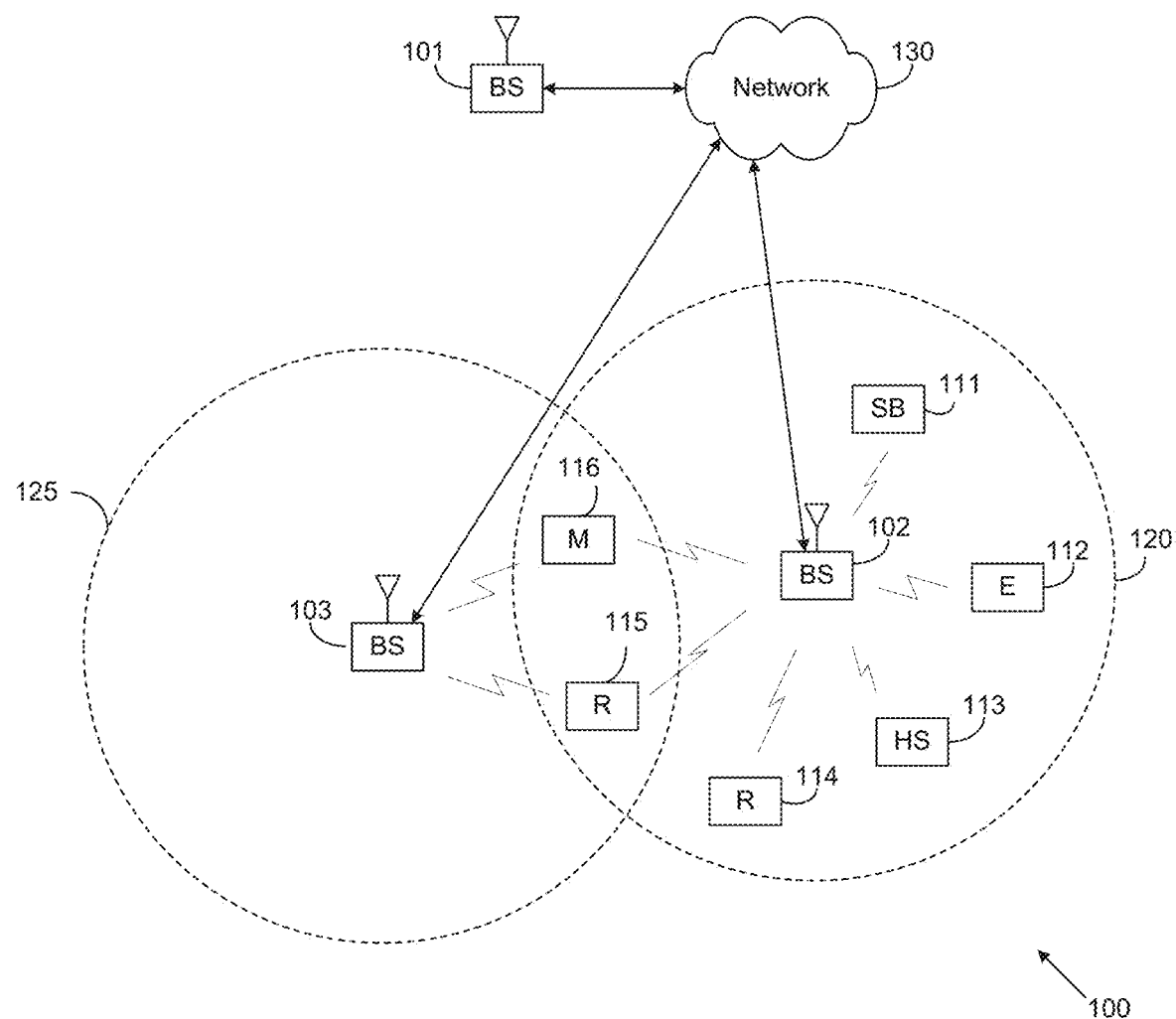
FIG. 1 illustrates an example wireless network according to various embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

List of Acronyms

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); and 3GPP TS 36.331 version 12.4.0, "E-UTRA, Radio Resource Control (RRC) Protocol Specification" ("REF 4").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD- MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency-shift keying (FSK) and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network. Instead of "eNB", an alternative term "gNB" (general Node B) can also be used. Depending on the network type, other well-known terms can be used instead of "eNB" or "BS," such as "base station" or "access point." For the sake of convenience, the terms "eNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, one or more of eNB 101, eNB 102, and eNB 103 transmit to UEs 111-116 with precoder cycling and configure UEs 111-116 for CSI reporting as described in embodiments of the present disclosure. In various embodiments, one or more of UEs 111-116 receive and demodulate at least one transmission with precoder cycling as well as perform calculation and reporting for of CSI.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
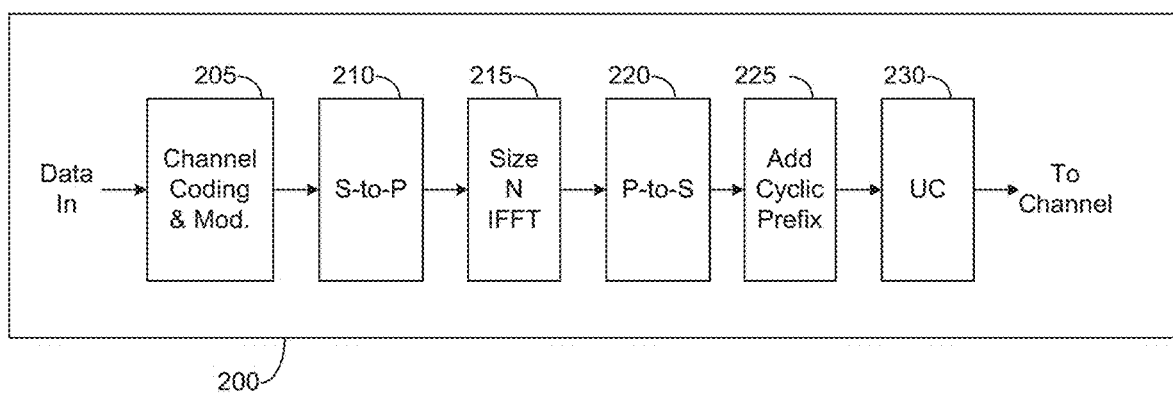
FIGS. 2A and 2B illustrate example wireless transmit and receive paths according to various embodiments of the present disclosure.
Figure 2B:
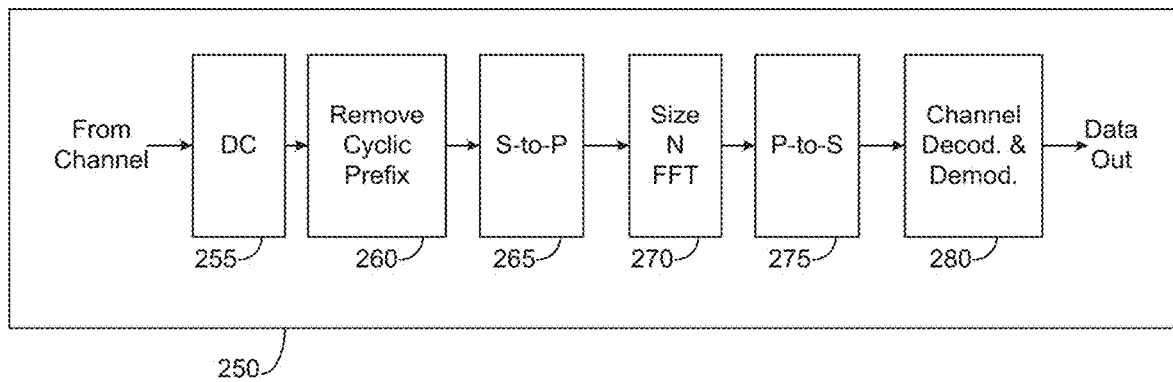

FIGS. 2A and 2B illustrate example wireless transmit and receive paths according to the present disclosure. In the following description, a transmit path 200 can be described as being implemented in an eNB (such as eNB 102), while a receive path 250 can be described as being implemented in a UE (such as UE 116). However, it will be understood that the receive path 250 could be implemented in an eNB and that the transmit path 200 could be implemented in a UE. In some embodiments, the receive path 250 is configured to receive and demodulate at least one transmission with precoder cycling as well as support channel quality measurement and reporting as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The up-converter 230 modulates (such as up-converts) the output of the 'add cyclic prefix' block 225 to an RF frequency for transmission via a wireless channel. The signal can also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the eNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to eNBs 101-103 and can implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
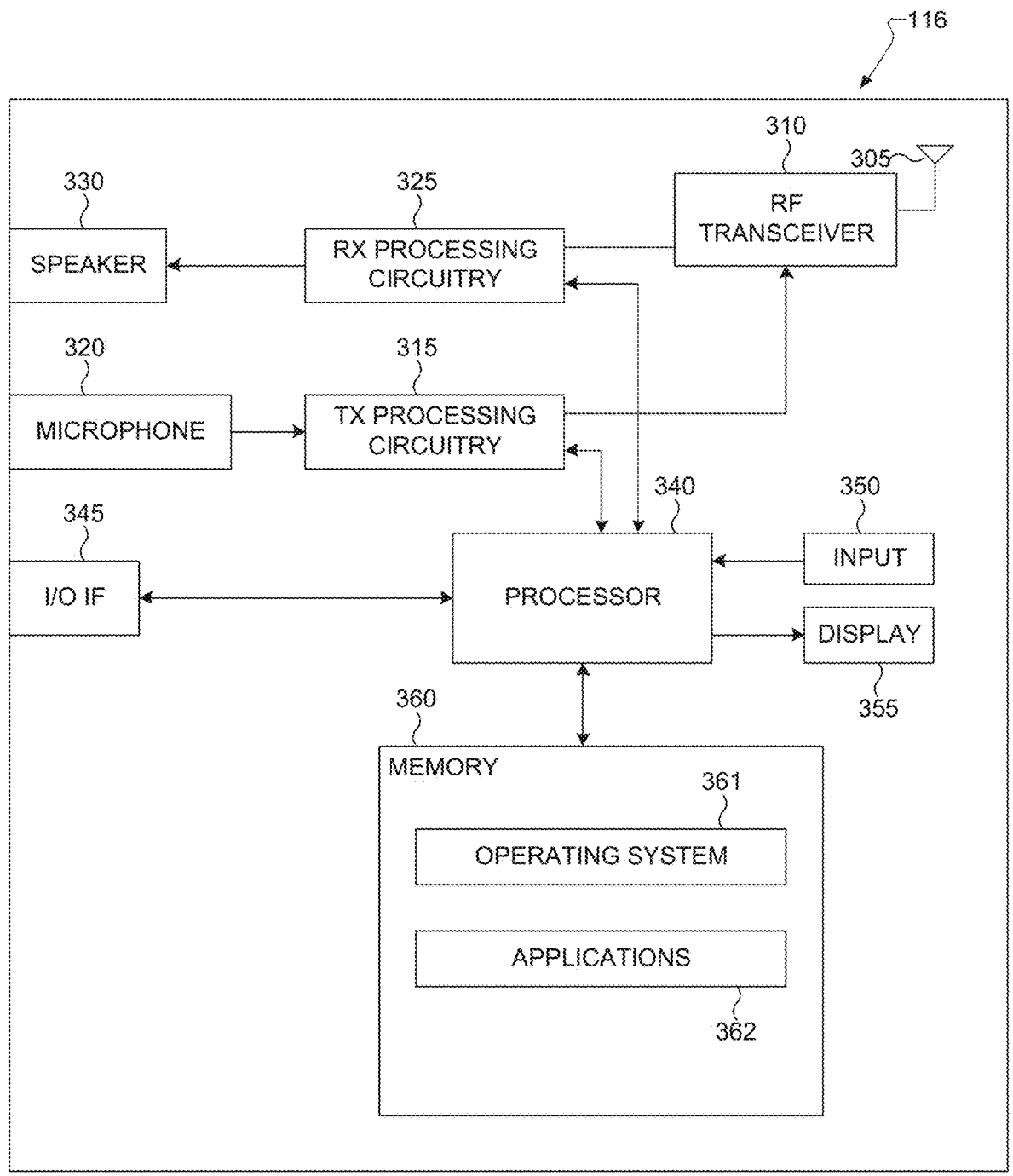
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CQI measurement and reporting for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
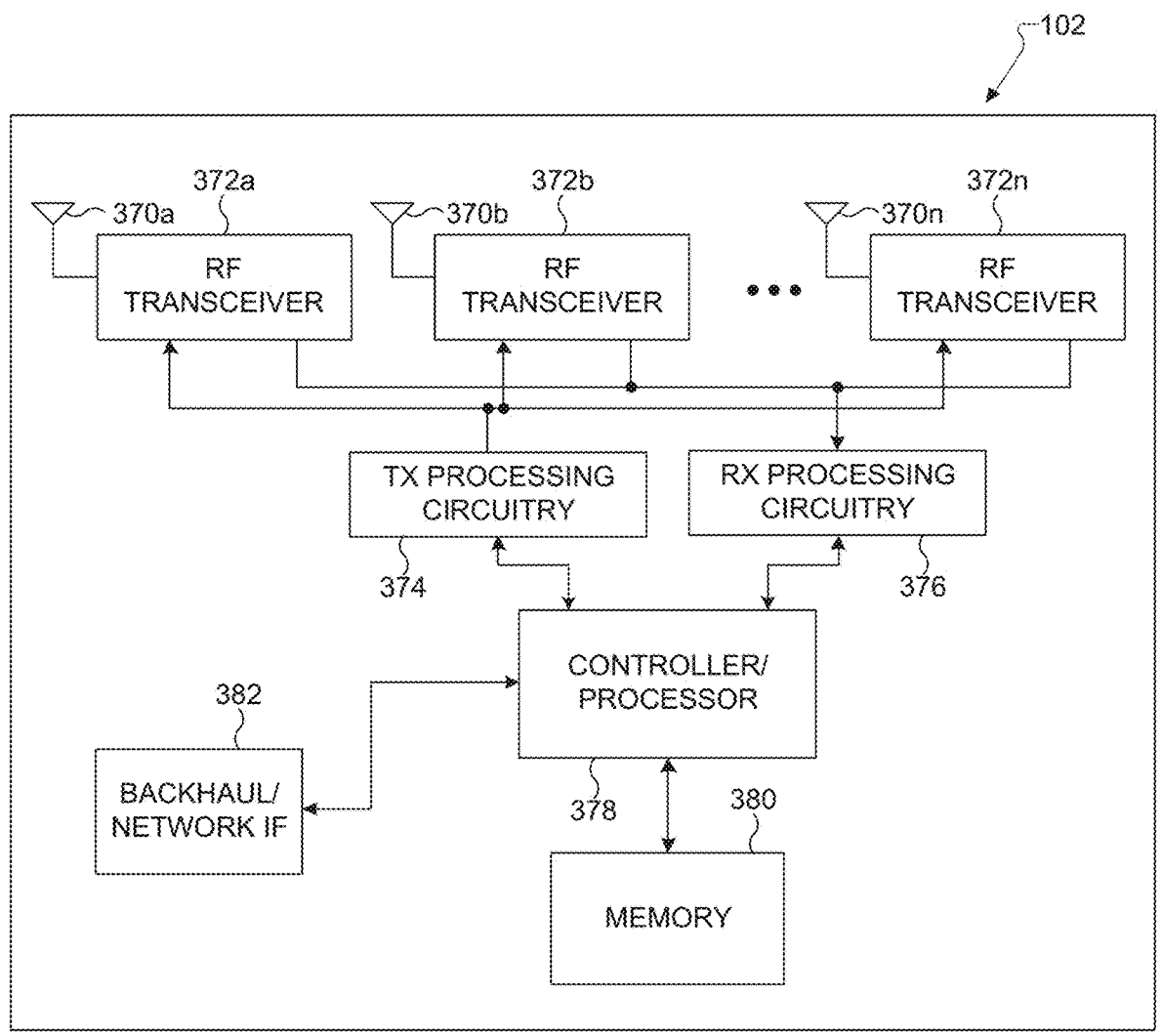
FIG. 3B illustrates an example enhanced NodeB (eNB) according to various embodiments of the present disclosure.

FIG. 3B illustrates an example eNB 102 according to the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of the present disclosure to any particular implementation of an eNB. eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web real-time communications (RTC). The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G or new radio access technology or NR, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) perform configuration and signaling for CSI reporting.

Although FIG. 3B illustrates one example of an eNB 102, various changes can be made to FIG. 3B. For example, the eNB 102 could include any number of each component shown in FIG. 3A. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
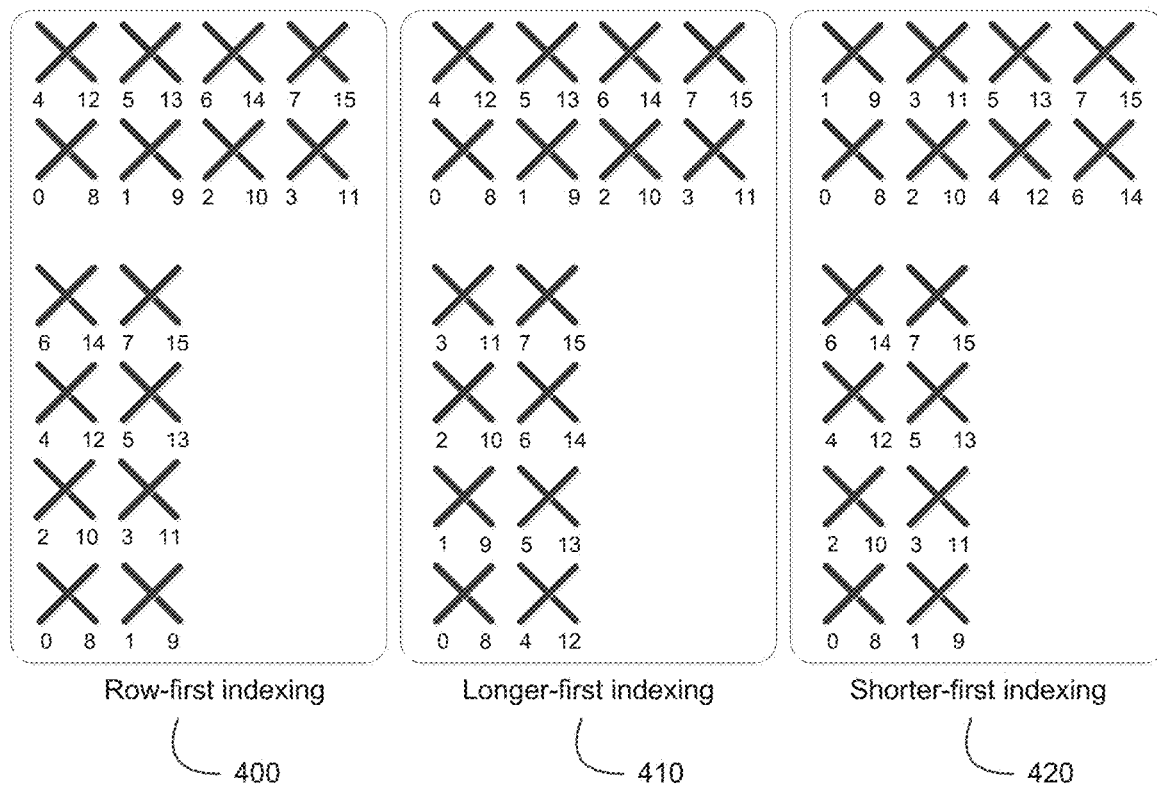
FIG. 4 illustrates example two-dimensional (2D) antenna arrays constructed from 16 dual-polarized elements arranged in a 4×2 or 2×4 rectangular format which can be utilized in various embodiments of the present disclosure.

FIG. 4 illustrates example two-dimensional (2D) antenna arrays constructed from 16 dual-polarized elements arranged in a 4×2 or 2×4 rectangular format which can be utilized in various embodiments of the present disclosure. In this illustrative embodiment, the 2D dual-polarized antenna port array includes $M_a$ rows and $N_a$ columns where ($M_a$, $N_a$)=(2,4) and (4,2). The embodiment of the 2D dual-polarized antenna port array shown in FIG. 4 is for illustration only. Other embodiments of the 2D dual-polarized antenna port array could be used without departing from the scope of the present disclosure.

The example 2D dual-polarized antenna port array arrangement results in a total of $2M_aN_a=16$ ports, each mapped to one CSI-RS port. The three indices 400, 410, and 420 are three examples in indexing the 16 antenna ports as a means of mapping antenna ports to precoding matrix elements. For row-first indexing 400, antenna ports associated with the same polarization group are indexed in a row-first manner regardless of ($M_a$, $N_a$). For longer-first indexing 410, antenna ports associated with the same polarization group are indexed in a column-first manner when $M_a > N_a$, but row-first manner when $M_a \leq N_a$. For shorter-first indexing 420, antenna ports associated with the same polarization group are indexed in a row-first manner when $M_a > N_a$, but column-first manner when $M_a \leq N_a$. Indexing 400 is therefore termed row-first indexing while indexing 410 longer-first indexing and indexing 420 shorter-first indexing.

In these illustrative embodiments, both $M_a$ and $N_a$ can be configured by an eNB for a UE. In another example, rather than defining $M_a$ and $N_a$ as the number of rows and columns of the rectangular array of ports or port pattern, respectively, these two parameters can be defined as two-dimensional precoding codebook parameters. The values of $M_a$ and $N_a$ partly determine the manner in which a codebook (hence each precoding matrix element in the codebook) is mapped onto antenna ports of a one- or two-dimensional antenna array. This configuration can be performed with and without signaling the total number of antenna ports. When a UE is configured with a codebook, these parameters can be included either in a corresponding CSI process configuration or NZP (non-zero-power) CSI-RS resource configuration.

In LTE systems, precoding codebooks are utilized for CSI reporting. Two categories of CSI reporting modes are supported: PUSCH-based aperiodic CSI (A-CSI) and PUCCH-based periodic CSI (P-CSI). In each category, different modes are defined based on frequency selectivity of CQI and/or PMI, that is, whether wideband (one CSI parameter calculated for some or all of the "set of S subbands") or subband (one CSI parameter calculated for each "set S subband") reporting is performed. The supported CSI reporting modes are given in TABLE 1 and 2.

TABLE 1

CQI and PMI Feedback Types for PUSCH (Aperiodic) CSI Reporting Modes

| | | PMI Feedback Type | |
|---|---|---|---|
| | No PMI | Single PMI | Multiple PMI |
| PUSCH CQI Feedback Type | Wideband (wideband CQI) | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

TABLE 2

CQI and PMI Feedback Types for PUCCH (Periodic) CSI Reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

In Rel.12 LTE, dual-stage precoding codebook enumerated with a first and a second PMI values ($i_1$ and $i_2$, respectively) are supported for 4 and 8 antenna ports. The first PMI value $i_1$ is associated with a group of four DFT beams/precoders. The second PMI value $i_2$, on the other hand, selects one out of four beams/precoders indicated with $i_1$, along with QPSK co-phasing between two polarization groups. For a given value of $i_1$, an indicator of long-term channel statistics, represents a group of four beams which span a fixed AoD spread of approximately 20 degrees from which a UE selects one beam and applies co-phasing (indicated by a value of $i_2$). As the value of $i_1$ is varied, a different range of AoD values is covered yet the spread remains the same. Therefore, Rel.12 LTE codebooks lack a capability to adapt to changes in AoD spread. Such a capability becomes more crucial when a large number of digitally-controlled antenna ports (beyond typical use cases of Rel.12 LTE) are utilized—not only from DL performance perspective, but also in terms of UL feedback efficiency.

In Rel.13 LTE, a flexible codebook structure which accommodates 2D CSI-RS port patterns is adopted where not only ($N_1$, $N_2$) are configurable, but also oversampling factors for both dimensions ($o_1$, $o_2$) and four types of codebook subset selections configured via RRC parameter codebook-Config. Using one or a combination of these configurations, the codebook can accommodate channels with different AoD profiles. Designed for 'CLASS A' CSI reporting, the rank-1 codebook can be described as follows.

For 8 antenna ports {15, 16, 17, 18, 19, 20, 21, 22}, 12 antenna ports {15, 16, 17, 18, 19, 20, 21, 22, 23, 24, 25, 26}, 16 antenna ports {15, 16, 17, 18, 19, 20, 21, 22, 23, 24, 25, 26, 27, 28, 29, 30}, and UE configured with higher layer parameter eMIMO-Type, and eMIMO-Type is set to 'CLASS A', for 1-layer CSI reporting, each PMI value corresponds to three codebook indices given in Table 3-B, 3-C, 3-D, or 3-E, where the quantities $\varphi_n$, $u_m$ and $v_{l,m}$ are given by $$\varphi_n = e^{j\pi n/2} \quad \text{(Equation 1)}$$

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

The values of $N_1$, $N_2$, $O_1$, and $O_2$ are configured with the higher-layer parameters codebook-Config-N1, codebook-Config-N2, codebook-Over-Sampling-RateConfig-O1, and codebook-Over-Sampling-RateConfig-O2, respectively. The supported configurations of ($O_1$, $O_2$) and ($N_1$, $N_2$) for a given number of CSI-RS ports are given in Table 3-A. The number of CSI-RS ports, P, is $2N_1N_2$. UE is not expected to be configured with value of Codebook-Config set to 2 or 3, if the value of codebookConfigN2 is set to 1. UE shall only use $i_{1,2}=0$ and shall not report $i_{1,2}$ if the value of codebook-ConfigN2 is set to 1. A first PMI value $i_1$ corresponds to the codebook indices pair $\{i_{1,1}, i_{1,2}\}$, and a second PMI value $i_2$ corresponds to the codebook index $i_2$.

TABLE 3-A

Supported configurations of ($O_1$, $O_2$) and ($N_1$, $N_2$)

| Number of CSI-RS antenna ports, P | ($N_1$, $N_2$) | ($O_1$, $O_2$) |
|---|---|---|
| 8 | (2, 2) | (4, 4), (8, 8) |
| 12 | (2, 3) | (8, 4), (8, 8) |
| | (3, 2) | (8, 4), (4, 4) |
| 16 | (2, 4) | (8, 4), (8, 8) |
| | (4, 2) | (8, 4), (4, 4) |
| | (8, 1) | (4, —), (8, —) |

TABLE 3-B

Codebook for 1-layer CSI reporting using antenna ports 15 to 14 + P, Codebook-Config = 1

| $i_{1,1}$ | $i_{1,2}$ | $i_2$ = 0 | 1 | 2 | 3 |
|---|---|---|---|---|---|
| $0, 1, \ldots, O_1N_1 - 1$ | $0, 1, \ldots, O_2N_2 - 1$ | $W^{(1)}_{i_{1,1},i_{1,2},0}$ | $W^{(1)}_{i_{1,1},i_{1,2},1}$ | $W^{(1)}_{i_{1,1},i_{1,2},2}$ | $W^{(1)}_{i_{1,1},i_{1,2},3}$ | where $W^{(1)}_{l,m,n} = \dfrac{1}{\sqrt{P}} \begin{bmatrix} v_{l,m} \\ \varphi_n v_{l,m} \end{bmatrix}$

TABLE 3-C

Codebook for 1-layer CSI reporting using antenna ports 15 to 14 + P, Codebook-Config = 2

| $i_{1,1}$ | $i_{1,2}$ | $i_2$ = 0 | 1 | 2 | 3 |
|---|---|---|---|---|---|
| $0, 1, \ldots, \dfrac{N_1 O_1}{2} - 1$ | $0, 1, \ldots, \dfrac{N_2 O_2}{2} - 1$ | $W^{(1)}_{2i_{1,1},2i_{1,2},0}$ | $W^{(1)}_{2i_{1,1},2i_{1,2},1}$ | $W^{(1)}_{2i_{1,1},2i_{1,2},2}$ | $W^{(1)}_{2i_{1,1},2i_{1,2},3}$ |

| $i_{1,1}$ | $i_{1,2}$ | $i_2$ = 4 | 5 | 6 | 7 |
|---|---|---|---|---|---|
| $0, 1, \ldots, \dfrac{N_1 O_1}{2} - 1$ | $0, 1, \ldots, \dfrac{N_2 O_2}{2} - 1$ | $W^{(1)}_{2i_{1,1}+1,2i_{1,2},0}$ | $W^{(1)}_{2i_{1,1}+1,2i_{1,2},1}$ | $W^{(1)}_{2i_{1,1}+1,2i_{1,2},2}$ | $W^{(1)}_{2i_{1,1}+1,2i_{1,2},3}$ |

| $i_{1,1}$ | $i_{1,2}$ | $i_2$ = 8 | 9 | 10 | 11 |
|---|---|---|---|---|---|
| $0, 1, \ldots, \dfrac{N_1 O_1}{2} - 1$ | $0, 1, \ldots, \dfrac{N_2 O_2}{2} - 1$ | $W^{(1)}_{2i_{1,1},2i_{1,2}+1,0}$ | $W^{(1)}_{2i_{1,1},2i_{1,2}+1,1}$ | $W^{(1)}_{2i_{1,1},2i_{1,2}+1,2}$ | $W^{(1)}_{2i_{1,1},2i_{1,2}+1,3}$ |

| $i_{1,1}$ | $i_{1,2}$ | $i_2$ = 12 | 13 | 14 | 15 |
|---|---|---|---|---|---|
| $0, 1, \ldots, \dfrac{N_1 O_1}{2} - 1$ | $0, 1, \ldots, \dfrac{N_2 O_2}{2} - 1$ | $W^{(1)}_{2i_{1,1}+1,2i_{1,2}+1,0}$ | $W^{(1)}_{2i_{1,1}+1,2i_{1,2}+1,1}$ | $W^{(1)}_{2i_{1,1}+1,2i_{1,2}+1,2}$ | $W^{(1)}_{2i_{1,1}+1,2i_{1,2}+1,3}$ | where $W^{(1)}_{l,m,n} = \dfrac{1}{\sqrt{P}} \begin{bmatrix} v_{l,m} \\ \varphi_n v_{l,m} \end{bmatrix}$

TABLE 3-D

Codebook for 1-layer CSI reporting using antenna ports 15 to 14 + P, Codebook-Config = 3

| $i_{1,1}$ | $i_{1,2}$ | $i_2$ = 0 | 1 | 2 | 3 |
|---|---|---|---|---|---|
| $0, 1, \ldots, \dfrac{N_1 O_1}{2} - 1$ | $0, 1, \ldots, \dfrac{N_2 O_2}{2} - 1$ | $W^{(1)}_{2x,2y,0}$ | $W^{(1)}_{2x,2y,1}$ | $W^{(1)}_{2x,2y,2}$ | $W^{(1)}_{2x,2y,3}$ |

| $i_{1,1}$ | $i_{1,2}$ | $i_2$ = 4 | 5 | 6 | 7 |
|---|---|---|---|---|---|
| $0, 1, \ldots, \dfrac{N_1 O_1}{2} - 1$ | $0, 1, \ldots, \dfrac{N_2 O_2}{2} - 1$ | $W^{(1)}_{2x+2,2y,0}$ | $W^{(1)}_{2x+2,2y,1}$ | $W^{(1)}_{2x+2,2y,2}$ | $W^{(1)}_{2x+2,2y,3}$ |

TABLE 3-D-continued

Codebook for 1-layer CSI reporting using antenna ports 15 to 14 + P, Codebook-Config = 3

| | | $i_2$ | | | |
|---|---|---|---|---|---|
| $i_{1,1}$ | $i_{1,2}$ | 8 | 9 | 10 | 11 |
| $0, 1, \ldots, \frac{N_1 O_1}{2} - 1$ | $0, 1, \ldots, \frac{N_2 O_2}{2} - 1$ | $W_{2x+1,2y+1,0}^{(1)}$ | $W_{2x+1,2y+1,1}^{(1)}$ | $W_{2x+1,2y+1,2}^{(1)}$ | $W_{2x+1,2y+1,3}^{(1)}$ |

| | | $i_2$ | | | |
|---|---|---|---|---|---|
| $i_{1,1}$ | $i_{1,2}$ | 12 | 13 | 14 | 15 |
| $0, 1, \ldots, \frac{N_1 O_1}{2} - 1$ | $0, 1, \ldots, \frac{N_2 O_2}{2} - 1$ | $W_{2x+3,2y+1,0}^{(1)}$ | $W_{2x+3,2y+1,1}^{(1)}$ | $W_{2x+3,2y+1,2}^{(1)}$ | $W_{2x+3,2y+1,3}^{(1)}$ | where $x = i_{1,1}$, $y = i_{1,2}$, $W_{l,m,n}^{(1)} = \frac{1}{\sqrt{P}} \begin{bmatrix} v_{l,m} \\ \varphi_n v_{l,m} \end{bmatrix}$, if $N_1 \geq N_2$ $x = i_{1,2}$, $y = i_{1,1}$, $W_{l,m,n}^{(1)} = \frac{1}{\sqrt{P}} \begin{bmatrix} v_{m,l} \\ \varphi_n v_{m,l} \end{bmatrix}$, if $N_1 < N_2$

TABLE 3-E

Codebook for 1-layer CSI reporting using antenna ports 15 to 14 + P, Codebook-Config = 4

| | | $i_2$ | | | |
|---|---|---|---|---|---|
| $i_{1,1}$ | $i_{1,2}$ | 0 | 1 | 2 | 3 |
| $0, 1, \ldots, \frac{N_1 O_1}{2} - 1$ | $0, 1, \ldots, \frac{N_2 O_2}{2} - 1$ | $W_{2x,2y,0}^{(1)}$ | $W_{2x,2y,1}^{(1)}$ | $W_{2x,2y,2}^{(1)}$ | $W_{2x,2y,3}^{(1)}$ |

| | | $i_2$ | | | |
|---|---|---|---|---|---|
| $i_{1,1}$ | $i_{1,2}$ | 4 | 5 | 6 | 7 |
| $0, 1, \ldots, \frac{N_1 O_1}{2} - 1$ | $0, 1, \ldots, \frac{N_2 O_2}{2} - 1$ | $W_{2x+1,2y,0}^{(1)}$ | $W_{2x+1,2y,1}^{(1)}$ | $W_{2x+1,2y,2}^{(1)}$ | $W_{2x+1,2y,3}^{(1)}$ |

| | | $i_2$ | | | |
|---|---|---|---|---|---|
| $i_{1,1}$ | $i_{1,2}$ | 8 | 9 | 10 | 11 |
| $0, 1, \ldots, \frac{N_1 O_1}{2} - 1$ | $0, 1, \ldots, \frac{N_2 O_2}{2} - 1$ | $W_{2x+2,2y,0}^{(1)}$ | $W_{2x+2,2y,1}^{(1)}$ | $W_{2x+2,2y,2}^{(1)}$ | $W_{2x+2,2y,3}^{(1)}$ |

| | | $i_2$ | | | |
|---|---|---|---|---|---|
| $i_{1,1}$ | $i_{1,2}$ | 12 | 13 | 14 | 15 |
| $0, 1, \ldots, \frac{N_1 O_1}{2} - 1$ | $0, 1, \ldots, \frac{N_2 O_2}{2} - 1$ | $W_{2x+3,2y,0}^{(1)}$ | $W_{2x+3,2y,1}^{(1)}$ | $W_{2x+3,2y,2}^{(1)}$ | $W_{2x+3,2y,3}^{(1)}$ | where $x = i_{1,1}$, $y = i_{1,2}$, $W_{l,m,n}^{(1)} = \frac{1}{\sqrt{P}} \begin{bmatrix} v_{l,m} \\ \varphi_n v_{l,m} \end{bmatrix}$, if $N_1 \geq N_2$ $x = i_{1,2}$, $y = i_{1,1}$, $W_{l,m,n}^{(1)} = \frac{1}{\sqrt{P}} \begin{bmatrix} v_{m,l} \\ \varphi_n v_{m,l} \end{bmatrix}$, if $N_1 < N_2$ Based on the above codebook, a resulting precoding matrix can be described in Equation 2. That is, the first stage precoder can be described as a Kronecker product of a first and a second precoding vector (or matrix), which can be associated with a first and a second dimension, respectively. This type is termed partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ can be described as a function of an index which serves as a PMI component. As a result, the precoding matrix W can be described as a function of 3 PMI components $i_{1,1}$, $i_{1,2}$, $i_2$. The first stage pertains to a long-term component. Therefore, the first stage is associated with long-term channel statistics such as the aforementioned angle-of-departure (AoD) profile and AoD spread. On the other hand, the second stage pertains to a short-term component which performs selection, co-phasing, or any linear operation to the first component precoder $W_{1,1}(i_{1,1}) \otimes W_{1,2}(i_{1,2})$. In the present disclosure, $A \otimes B$ denotes the Kronecker product between two matrices A and B. The precoder $W_2(i_2)$, therefore, performs a linear transformation of the long-term component such as a linear combination of a set of basis functions or vectors associated with the column vectors of $W_{1,1}(i_{1,1}) \otimes W_{1,2}(i_{1,2})$).

$$W(i_{1,1}, i_{1,2}, i_2) = \underbrace{(W_{1,1}(i_{1,1}) \otimes W_{1,2}(i_{1,2}))}_{w_1(i_{1,1}, i_{1,2})} W_2(i_2) \quad \text{(Equation 2)}$$

Here, a UE measures a CSI-RS in a subframe designated to carry CSI-RS, calculates a CSI (including PMI, RI, and CQI where each of these three CSI parameters can include multiple components) based on the measurement, and reports the calculated CSI to a serving eNB 102.

More generally, a precoding matrix or a precoder, which can be used by an eNB (such as 102) to perform short-term precoding for transmitting to a UE and assumed by a UE to derive a CSI report, can be described as a dual-stage precoding matrix:

$$W = W_1 W_2 \quad \text{(Equation 3)}$$

Referring to FIG. 4, the size of the precoding matrix W is $N_{TX} \times N_L$ where $N_{TX} = 2M_a N_a$ is the total number of antenna or CSI-RS ports and $N_L$ is the number of transmission layers (also termed the rank). The first-stage precoder $W_1$ pertains to a long-term component and is associated with long-term channel statistics. In addition, $W_1$ is wideband (the same $W_1$ for some or all of the set of S subbands). The second-stage precoder $W_2$ pertains to a short-term component which performs selection, co-phasing, or any linear operation to $W_1$. Therefore, the number of columns of $W_1$ can be perceived as the number of basis vectors $N_b$ for $W_2$. In addition, $W_2$ can be either wideband (the same $W_2$ for some or all of the set of S subbands) or subband (one $W_2$ for each set S subband).

For 2D (two-dimensional) rectangular port array, in addition to the partial KP structure described in Equation 1, in an alternative precoding structure, each of the first and the second stage precoders can be described as a Kronecker product of a first and a second precoder. This example embodiment is termed the full Kronecker Product (full KP) codebook. The subscripts m and n in $W_{m,n}(i_{m,n})$ denote precoding stage (first or second) and dimension (first or second, such as vertical or horizontal), respectively. Each of the precoders $W_{m,n}$ is a function of an index which serves as a PMI component. Thus, the precoding matrix W can be described in terms of 4 PMI components $i_{1,1}, i_{1,2}, i_{2,1}, i_{2,2}$ as follows.

$$W(i_{1,1}, i_{1,2}, i_{2,1}, i_{2,2}) = (W_{1,1}(i_{1,1}) W_{2,1}(i_{2,1})) \otimes (W_{1,2}(i_{1,2})$$
$$W_{2,2}(i_{2,2})) = (W_{1,1}(i_{1,1}) \otimes W_{1,2}(i_{1,2}))$$
$$(W_{2,1}(i_{2,1}) \otimes (W_{2,2}(i_{2,2})) \quad \text{(Equation 3)}$$

Given a precoding codebook (a set of precoding matrices $W(i_{1,1}, i_{1,2}, i_{2,1}, i_{2,2})$), a UE measures a CSI-RS in a subframe designated to carry CSI-RS, calculates a CSI (including PMI, RI, and CQI where each of these three CSI parameters can include multiple components) based on the measurement, and reports the calculated CSI to a serving eNB 102. This PMI represents an index of a recommended precoding matrix in the precoding codebook. Different precoding codebooks can be used for different values of RI.

In the present disclosure, the precoder structure in Equation 1 in accordance to the Rel.13 codebook described above is largely assumed to describe the following embodiments.

Extensions for the structure in Equation 3 are straightforward to those skilled in the art.

The above precoding description is especially suitable when the serving eNB transmits non-precoded CSI-RS (NP CSI-RS). That is, a cell-specific one-to-one mapping between CSI-RS port and TXRU (transceiver unit) is utilized. Here, different CSI-RS ports have the same wide beam width and direction and hence generally cell wide coverage. This use case can be realized when the eNB configures the UE with 'CLASS A' eMIMO-Type which corresponds to NP CSI-RS. Other than CQI and RI, CSI reports associated with 'CLASS A' or 'nonPrecoded' eMIMO-Type include (assuming the partial KP design inherent in the Rel.13 codebook described above) a three-component PMI $\{i_{1,1}, i_{1,2}, i_2\}$.

Another type of CSI-RS applicable to FD-MIMO is beamformed CSI-RS (BF CSI-RS). For example, beamforming operation, either cell-specific or UE-specific, is applied on a non-zero-power (NZP) CSI-RS resource (including multiple ports). Here, at least at a given time/frequency CSI-RS ports have narrow beam widths and hence not cell wide coverage, and (at least from the eNB perspective) at least some CSI-RS port-resource combinations have different beam directions. This beamforming operation is intended to increase CSI-RS coverage or penetration. In addition, when UE-specific beamforming is applied to a CSI-RS resource (termed the UE-specific or UE-specifically beamformed CSI-RS), CSI-RS overhead reduction can be obtained when NZP CSI-RS resources are allocated efficiently through resource sharing (pooling) for multiple UEs either in time domain (for instance, aperiodic transmission), beam domain (UE-specific beamforming), or dynamic CSI-RS resource (re)configuration. When a UE is configured to receive BF CSI-RS from a serving eNB, the UE can be configured to report PMI parameters associated with $W_2$ ($W_{2,1}$ and/or $W_{2,2}$) without $W_1$ ($W_{1,1}$ and/or $W_{1,2}$) or, in general, associated with a single-stage precoder/codebook. This use case can be realized when the eNB configures the UE with 'CLASS B' eMIMO-Type which corresponds to BF CSI-RS. Other than CQI and RI, CSI reports associated with 'CLASS B' or 'beamformed' eMIMO-Type (with one CSI-RS resource and alternative codebook) include a one-component PMI n. Although a single PMI defined with respect to a distinct codebook, this PMI can be associated with the second-stage PMI component of 'CLASS A'/'nonPrecoded' codebooks $i_2$.

Therefore, given a precoding codebook (a set of precoding matrices $W(i_{1,1}, i_{1,2}, i_2)$), a UE measures a CSI-RS in a subframe designated to carry CSI-RS, calculates/determines a CSI (including PMI, RI, and CQI where each of these three CSI parameters can include multiple components) based on the measurement, and reports the calculated CSI to a serving eNB. In particular, this PMI is an index of a recommended precoding matrix in the precoding codebook. Similar to that for the first type, different precoding codebooks can be used for different values of RI. The measured CSI-RS can be one of the two types: non-precoded (NP) CSI-RS and beamformed (BF) CSI-RS. As mentioned, in Rel.13, the support of these two types of CSI-RS is given in terms of two eMIMO-Types: 'CLASS A' (with one CSI-RS resource) and 'CLASS B' (with one or a plurality of CSI-RS resources), respectively.

Each of the above CSI-RS configurations uses or requires a different transmission strategy which potentially uses or requires a different CSI reporting format for a configured CSI reporting mode. In addition to these factors, the 2D pattern of codebook mapped to CSI-RS ports also determines the CSI reporting format. In particular, a flexible configuration mechanism which allows a serving eNB to configure a UE with NP CSI-RS and UE-specific BF CSI-RS on a subframe basis is beneficial. This can improve system performance through CSI-RS overhead reduction, inter-cell interference reduction, and coverage improvement.

In addition, another CSI parameter (beside CQI, PMI, and RI) can be introduced to enable beam or NZP CSI-RS resource selection for the so-called cell-specific beam-formed CSI-RS (or enhanced vertical or virtual sectorization). This parameter is termed beam index (BI) for exemplary and illustrative purposes. This scheme utilizes either multiple CSI processes or multiple NZP CSI-RS resources for CSI reporting where one CSI process or NZP CSI-RS resource is associated with a beam (or a virtual sector). A beam is defined as a collection of CSI-RS antenna ports. In this scheme, a UE measures each of the beams (or virtual sectors), calculates, and reports CSI for each beam (and hence each CSI process or NZP CSI-RS resource). The UE reports a beam index BI which informs the eNB of a recommended beam selection. In the present disclosure, this beam index is denoted as $i_b$ for illustrative purposes. If K>1 NZP CSI-RS resources (configured for or associated with one CSI process) correspond to K>1 beams or virtual sectors, beam selection is essentially NZP CSI-RS resource selection. Hence, the term CSI-RS resource index (CRI) can be used instead of beam index (BI). These two terms can be used interchangeably in the present disclosure.

Therefore, for PUCCH-based periodic CSI reporting or PUSCH-based aperiodic CSI reporting, a CSI report can include the following CSI parameters: 1) RI, 2) CQI associated with one (for RI=1) or two codewords (RI>1), 3) PMI values: $\{i_{1,1}, i_{1,2}, i_{2,1}, i_{2,2}\}$ or $\{i_{1,1}, i_{1,2}, i_2\}$ or $\{i_1, i_2\}$ for non-precoded CSI-RS (or a selected beam or NZP CSI-RS resource in cell-specific beamformed CSI-RS); $\{i_{2,1}, i_{2,2}\}$ or $\{i_2\}$ for UE-specific beamformed CSI-RS, 4) BI: $i_b$ In scenarios where DL long-term channel statistics can be measured through UL signals at a serving eNB, UE-specific BF CSI-RS can be readily used. This is typically feasible when UL-DL duplex distance is sufficiently small. When this condition does not hold, however, some UE feedback is necessary for the eNB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In a number of relevant scenarios, reliable CSI reporting is unattainable at an eNB. For instance, when a UE moves at a high mobility speed or inter-cell interference is bursty (due to a lack of efficient inter-cell interference coordination), CSI feedback from the UE quickly becomes obsolete at the eNB. In such circumstances, a fully closed-loop solution (that is, one which relies on fast UE feedback and high-resolution beamforming/precoding) incurs large system performance loss. This loss is amplified when larger antenna arrays, such as 2D arrays in FD-MIMO, are employed.

Figure 5:
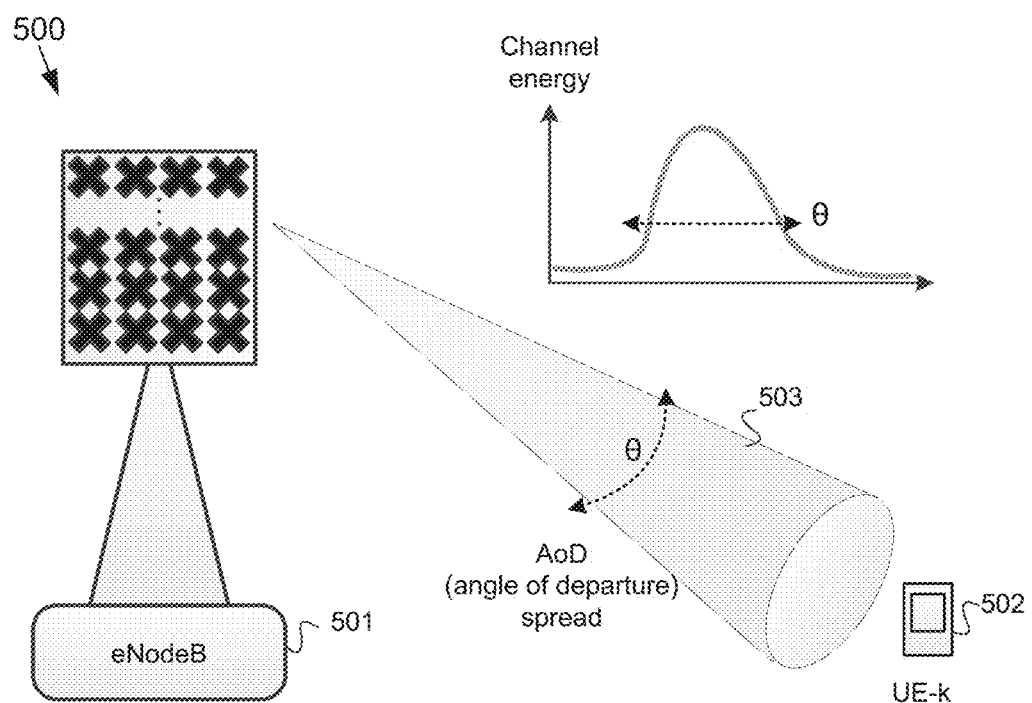
FIG. 5 illustrates an example of downlink transmission where the channel exhibits a limited angle-of-departure (AoD) spread.

While short-term precoding tends to result in performance loss under those scenarios, long-term precoding, defined as one of which associated PMI is reported at a lower rate from a UE to an eNB, allows greater stability and predictability. This holds when a PMI feedback associated with the long-term precoding conveys precoding subspace information which is correlated to long-term DL channel statistics. Here, precoding subspace refers to a group or a range of possible precoding vectors (in contrast to a choice of precoding vector). FIG. 5 illustrates a typical scenario 500 where the long-term DL channel multi-path profile (between the eNB 501 and the UE 502) is contained within a range of DL AoD spread (503). If a reliable estimate of this long-term statistics is accessible at the eNB, the eNB can contain its transmission to the UE within a range of DL AoDs where channel energy is substantial. In other words, rather than transmitting data along a particular beam (associated with a single precoding vector), the eNB transmits across a plurality of beams. When CSI feedback impairments are severe, this approach is expected to be more robust that the one requiring short-term CSI reporting.

Therefore, there is a need to design a reduced feedback MIMO method based on the flexible Rel.13 codebook design which primarily relies on slower or long-term PMI feedback. This method includes transmission schemes and their associated CSI reporting schemes.

Terms such as 'non-precoded' (or 'NP') CSI-RS and 'beamformed' (or 'BF') CSI-RS are used throughout the present disclosure. The essence of the present disclosure does not change when different terms or names are used to refer to these two CSI-RS types. For example, 'CSI-RS-A' and 'CSI-RS-B' can refer to or be associated with these two CSI-RS types. Essentially these two CSI-RS types are a first CSI-RS and a second CSI-RS. In another example, CSI-RS resource type can be used to differentiate those two modes of operation instead of CSI-RS type. CSI-RS resources associated with these two types of CSI-RS can be referred to as 'a first CSI-RS resource' and 'a second CSI-RS resource', or 'CSI-RS-A resource' and 'CSI-RS-B resource'. Subsequently, the labels 'NP' and 'BF' (or 'np' and 'bf') are examples and can be substituted with other labels such as '1' and '2', or 'A' and 'B', or TYPE1 and TYPE2, or CLASS-A and CLASS-B. In another example, a MIMO type or eMIMO-Type which can be associated with CSI reporting operation can be used to differentiate those two modes of operation instead of CSI-RS type. For example, a UE is configured with a MIMO type or eMIMO-Type associated with CSI reporting behaviors and, in addition, CSI measurement behaviors. Names of higher-layer or RRC parameters utilized in this disclosure are exemplary and illustrative. Other names which serve same functionalities can be utilized.

The present disclosure includes at least three components: transmission scheme, CSI reporting scheme, and codebook for CSI reporting. Each of the three components can be used either by itself (without the other component) or in conjunction with at least one of the other two components.

Figure 6:
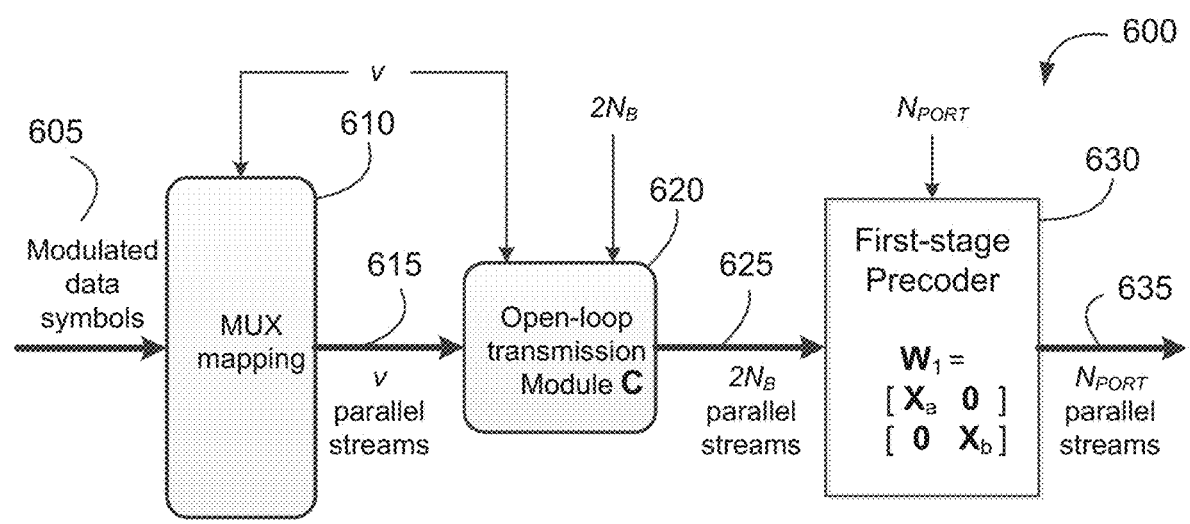
FIG. 6 illustrates an example of a transmission method or scheme according to various embodiments of the present disclosure.

For the first component (that is, transmission scheme), FIG. 6 depicts an exemplary transmission scheme 600 which represents the transmission scheme of the present disclosure. A stream of modulated data symbols 605 is multiplexed 610 into v parallel streams where v represents the transmission rank. The v parallel streams (615) serve as an input to the open-loop diversity module C in 620 which outputs $2N_B$ parallel streams 625 (where $2N_B \geq v$). The open-loop transmit diversity module generates $2N_B$-level diversity for each of the v parallel streams. The output of the open-loop diversity module is then applied to a first-stage precoder $W_1$ (630) to generate $N_{PORT}$ parallel streams 635. In this exemplary embodiment, the first-stage precoder is a block diagonal matrix where each of the two diagonal components is a $$\frac{N_{PORT}}{2} \times N_B$$

matrix associated with one polarization group. These two diagonal components can be the same ($X_a=X_b$) or different ($X_a \neq X_b$). For 2D rectangular port pattern, each of the two diagonal components is composed of a Kronecker product of first-dimension and second-dimension precoders. From the UE perspective, the first-stage precoder 630 does not need to be known for demodulation if DMRS (demodulation RS) is precoded with the same precoder (630) as data. The open-loop transmission module C, on the other, may need to be known for data demodulation and/or CSI calculation depending on the granularity of the open-loop transmission in frequency domain.

Based on the precoding structure in Equation 1, the open-loop diversity module C replaces the second-stage precoder $W_2$. Essentially, the first-stage precoder forms $N_B$ spatial beams per polarization group, generating a total of $2N_B$ spatial beams. The open-loop diversity module utilizes these $2N_B$ spatial beams to increase diversity gain for each of the v data streams. Therefore, from a UE perspective, the overall (semi-open-loop) precoding operation can be described in Equation 4—analogous to Equation 1 for a fully closed-loop solution. Since C is an open-loop diversity module, C is not associated with any PMI.

$$W(i_{1,1}, i_{1,2}) = \underbrace{(W_{1,1}(i_{1,1}) \otimes W_{1,2}(i_{1,2}))}_{W_1(i_{1,2},i_{1,2})} C \quad \text{(Equation 4)}$$

$$= \begin{bmatrix} X_a & 0 \\ 0 & X_b \end{bmatrix} C$$

Different open-loop diversity schemes are available such as space-frequency block code (SFBC), large-delay cyclic delay diversity (CDD), and precoder cycling. In this disclosure, schemes based on precoder cycling are utilized. For a given transmission layer, the cycling operation is performed in frequency domain, either across REs (sub-carriers) or PRBs (a group of 12 REs) or subbands (multiple PRBs). For a given PRB allocation, cycling can be performed across frequency (valid sub-carries) first, then time (valid sub-frames).

Several example embodiments for this transmission scheme are given as follows.

In one embodiment (labeled embodiment A.1), the precoder cycling pattern and its associated $C(\lambda, i)$ matrix in described in Equation 5. This pattern is defined for a given layer $\lambda$. An index parameter $I_{\lambda,i}$ is a precoding vector index for transmission layer $\lambda$ and RE index i which is defined starting from 0 and ending at $2N_B-1$.

$$I_{\lambda,i} = \mathrm{mod}(i+\Delta_\lambda, 2N_B), i=0,1,\ldots$$

$$C(\lambda,i) = e_{I_{\lambda,i}} = [0 \ldots 0 \ 1 \ 0 \ldots 0] \quad \text{(Equation 5)}$$

Here, $e_{I_{\lambda,i}}$ is a length-$2N_B$ column vector whose elements are zero except its ($I_{\lambda,i}-1$)-th element being 1. The offset parameter $\Delta_\lambda$ denotes a layer-specific index shift which avoids precoder overlap across different transmission layers. In effect, this pattern performs cycling (use of different precoder) across $N_B$ precoders and two polarization groups as the cycling index i (traversing frequency first, then time) is increased.

In another embodiment (labeled embodiment A.2), $C(\lambda, i)$ is given in Equation 5. But the cycling operation is performed in a unit of M REs rather than every RE as described in Equation 6. For example, cycling can be performed every PRB (M=12).

$$I_{\lambda,i} = \mathrm{mod}\left(\left\lfloor \frac{i}{M} \right\rfloor + \Delta_\lambda, 2N_B\right), \quad \text{(Equation 6)}$$

$$i = 0, 1, \ldots$$

The precoder cycling patterns can be predetermined (fixed) or implicitly derived from at least one UE-specific parameter (such as C-RNTI or PRB allocation) or configured by an eNB for a UE.

In yet another embodiment (labeled embodiment A.3), the cycling operation is performed across $N_B$ precoders within each of the two polarization groups. The two polarization groups can share a common cycling pattern or utilize two different patterns. When a common cycling pattern is utilized for the two polarization groups, a common precoder (chosen from the $N_B$ precoders) is used for the two polarization groups for a given RE or group of REs. Consequently, when different cycling patterns are utilized for the two polarization groups, different precoders (chosen from the $N_B$ precoders) are used for the two polarization groups for a given RE or group of REs. In this case, $C(\lambda, i)$ is defined as follows:

$$I_{\lambda,i}^{(a)} = \mathrm{mod}(i+\Delta_\lambda^{(a)}, N_B), \quad \text{(Equation 7)}$$

$$I_{\lambda,i}^{(b)} = \mathrm{mod}(i+\Delta_\lambda^{(b)}, N_B),$$

$$i = 0, 1, \ldots$$

$$C(\lambda, i) = \begin{bmatrix} \tilde{e}_{I_{\lambda,i}^{(a)}} \\ \tilde{e}_{I_{\lambda,i}^{(b)}} \end{bmatrix}$$

Here, $\tilde{e}_{I_{\lambda,i}}^{(a)}$ is a length-$N_B$ column vector whose elements are zero except its ($I_{\lambda,i}^{(a)}-1$)-th element being 1. Likewise, $\tilde{e}_{I_{\lambda,i}}^{(b)}$ is a length-$N_B$ column vector with only its ($I_{\lambda,i}^{(a)}-1$)-th element is non-zero whose elements are zero except its ($I_{\lambda,i}^{(b)}-1$)-th element being 1. When a common cycling pattern is utilized for the two polarization groups, $I_{\lambda,i}^{(a)}$ is equal to $I_{\lambda,i}^{(b)}$.

Analogous to embodiment A.2, cycling can also be performed in a unit of M REs rather than every RE. In that case, the description in Equation 7 can be modified as follows:

$$I_{\lambda,i}^{(a)} = \mathrm{mod}\left(\left\lfloor \frac{i}{M} \right\rfloor + \Delta_\lambda^{(a)}, N_B\right), \quad \text{(Equation 8)}$$

$$I_{\lambda,i}^{(b)} = \mathrm{mod}\left(\left\lfloor \frac{i}{M} \right\rfloor + \Delta_\lambda^{(b)}, N_B\right),$$

$$i = 0, 1, \ldots$$

$$C(\lambda, i) = \begin{bmatrix} \tilde{e}_{I_{\lambda,i}^{(a)}} \\ \tilde{e}_{I_{\lambda,i}^{(b)}} \end{bmatrix}$$

In yet another embodiment (labeled embodiment A.4), the precoder cycling pattern in embodiment A.3 can be extended by increasing the total number of precoders by applying co-phasing between two polarization groups. That is, the number of precoders per polarization group is increased from $N_B$ to $KN_B$ by applying K-value co-phasing $\{\varphi_k = e^{j2\pi k/K}, k=0, 1, \ldots, K-1\}$ between two polarization groups. The resulting set of $W_1(i_{1,1}, i_{1,2})$ precoders and cycling pattern are as follows:

$$\begin{bmatrix} [X_a \ X_a \ \ldots \ X_a] & 0 \\ 0 & [\varphi_0 X_b \ \varphi_1 X_b \ \ldots \ \varphi_{K-1} X_b] \end{bmatrix}$$ (Equation 9)

$$I_{\lambda,i}^{(a)} = \mod(i + \Delta_\lambda^{(a)}, KN_B),$$

$$I_{\lambda,i}^{(b)} = \mod(i + \Delta_\lambda^{(b)}, KN_B),$$

$$i = 0, 1, \ldots$$

$$C(\lambda, i) = \begin{bmatrix} \tilde{e}_{I_{\lambda,i}^{(a)}} \\ \tilde{e}_{I_{\lambda,i}^{(b)}} \end{bmatrix}$$

Here, $\tilde{e}_{I_{\lambda,i}}^{(a)}$ in (7) is a length-$KN_B$ column vector whose elements are zero except its $(I_{\lambda,i}^{(a)}-1)$-th element being 1. Likewise, $\tilde{e}_{I_{\lambda,i}}^{(b)}$ in (7) is a length-$KN_B$ column vector with only its $(I_{\lambda,i}^{(a)}-1)$-th element is non-zero whose elements are zero except its $(I_{\lambda,i}^{(b)}-1)$-th element being 1. When a common cycling pattern is utilized for the two polarization groups, $I_{\lambda,i}^{(a)}$ is equal to $I_{\lambda,i}^{(b)}$.

With QPSK co-phasing (K=4), the description in Equation 9 becomes:

$$\begin{bmatrix} [X_a \ X_a \ X_a \ X_a] & 0 \\ 0 & [X_b \ jX_b \ -X_b \ -jX_b] \end{bmatrix}$$ (Equation 10)

$$I_{\lambda,i}^{(a)} = \mod(i + \Delta_\lambda^{(a)}, 4N_B),$$

$$I_{\lambda,i}^{(b)} = \mod(i + \Delta_\lambda^{(b)}, 4N_B),$$

$$i = 0, 1, \ldots$$

$$C(\lambda, i) = \begin{bmatrix} \tilde{e}_{I_{\lambda,i}^{(a)}} \\ \tilde{e}_{I_{\lambda,i}^{(b)}} \end{bmatrix}$$

Analogous to embodiment A.2, cycling can also be performed in a unit of M REs rather than every RE.

The above transmission method/scheme embodiments can be implemented as follows. First, the choice of precoder set(s) used for precoder cycling does not need to be specified as DMRS is used for data demodulation. Therefore, an eNB can either predetermine or select this set based on CSI reporting from a UE. Second, the choice of precoder cycling pattern along with the number of precoders within one cycle (such as $2N_B$ in embodiments A.1 and A2, $N_B$ in embodiment A.3, and $KN_B$ in embodiment A.4) can be specified. The pattern and the number of precoders per cycle are associated to DMRS port pattern(s) utilized for semi-open-loop transmission. The used or required number of DMRS ports per transmission layer is the same as the number of precoders within one cycle.

To support such functionality, one embodiment is to specify an RE mapping which relates the data REs to precoder indices as well as DMRS ports to precoder indices can be specified. Another embodiment is to relate data REs directly to DMRS ports. In this case, a UE can assume that a same precoder is applied to some or all the data REs which are associated with a same DMRS port index. For example, assuming a set of available DMRS ports $\{p_0, p_1, \ldots, p_{N-1}\}$, precoder index I ($=I_{\lambda,i}$ or $I_{\lambda,i}^{(a)}$ or $I_{\lambda,i}^{(b)}$ in embodiments A.1, A.2, A.3, or A.4) can be mapped to DMRS port $p_I$. Alternatively, precoder index I can be mapped to DMRS port $p_{F(I)}$. If the Rel.13 LTE DMRS ports are used, the set of available DMRS ports is $\{7, 8, 9, 10, 11, 12, 13, 14\}$.

For both embodiments of DMRS-port-to-precoder-index mapping, several possibilities exist in terms of the number of precoders per cycle. For example, based on the Rel.13 codebook in TABLE 3-A, 3-B, 3-C, 3-D, and 3-E, a first embodiment employs a fixed number of precoders for a given codebook-Config. Therefore, the number of precoders per cycle is fixed and predetermined for a given codebook-Config. A second embodiment is to allow an eNB to configure the number of precoders per cycle for a given codebook-Config. In this case, the eNB informs the UE of the number of precoders (either $N_B$ or $KN_B$) to ensure that the UE knows the number of DMRS ports required or used. This can be done through L1 signaling (for instance, via a DL assignment or an UL grant on PDCCH), L2 signaling (such as MAC control element), or higher-layer (RRC) signaling.

For the second component (that is, CSI reporting), several example embodiments are described as follows. Each of the following embodiments of CSI reporting schemes can stand by itself (without any association with any transmission scheme) or can be used in conjunction with one or multiple transmission schemes which are previously described above.

In one embodiment (labeled embodiment B.1), a first-stage or first PMI (denoted as $i_1$) is reported. In reference to Equations 1 and 2, this PMI is associated with the first-stage precoding matrix $W_1$ (hence the shorthand $W_1$ reporting). In this embodiment, a first or first-stage PMI or $W_1$ is reported in conjunction with CQI and RI. When the first PMI is defined based on dual-stage Rel.12 codebooks, the first PMI corresponds to a value of the codebook index $i_1$ or a function of the codebook index $i_1$. When the first PMI is defined based on dual-stage Rel.13 codebooks for CLASS A eMIMO-Type (as described in the above TABLE 3-A, 3-B, 3-C, 3-D, and 3-E for rank-1 or one-layer transmission), the first PMI $i_1$ value corresponds to a value of the codebook index $\{i_{1,1}, i_{1,2}\}$ or a function of the codebook index $\{i_{1,1}, i_{1,2}\}$. In either case, the other PMI associated with the second-stage precoder $i_2$ is not reported.

When the first PMI is defined based on dual-stage Rel.13 codebooks (as described in the above TABLE 3-A, 3-B, 3-C, 3-D, and 3-E), the first PMI calculation is conditioned upon the configured value of codebook-Config parameter. For codebook-Config=1, only $N_B=1$ DFT beam per polarization group is used for a given $\{i_{1,1}, i_{1,2}\}$. For codebook-Config=2, 3, or 4, $N_B=4$ DFT beams per polarization group is used for a given $\{i_{1,1}, i_{1,2}\}$. The second or second-stage PMI $i_2$ is not reported and the UE shall assume that the eNB performs an open-loop diversity operation across the $N_B$ DFT beams or two polarization groups or a total of $2N_B$ DFT beams (taking into account two polarization groups). This can be specified, for example, by stating that a UE shall report one set of CQI values which represent channel quality for the first codeword, even when the recommended rank (RI) is greater than 1, but is calculated conditioned upon the reported RI (which can be the last reported periodic RI or the RI reported together with the CQI). In addition to the reported RI, CQI calculation can also be conditioned on the reported $i_1$ (which can be the last reported periodic $i_1$ or the $i_1$ reported together with the CQI). This first PMI value $i_1$ can include two components $\{i_{1,1}, i_{1,2}\}$. This one set of CQI values can be wideband CQI calculated assuming transmission on set S subbands, or subband CQIs where a subband CQI is calculated assuming transmission only on the subband.

If the Rel.13 codebook table as described in TABLE 3-A, 3-B, 3-C, 3-D, and 3-E (for CLASS A eMIMO-Type for rank-1) are to be utilized for the purpose of the present disclosure, an exemplary table can be defined as described in TABLE 4-A or 4-B below for rank 1. CSI calculation is then performed as follows. First, for a configured value of codebook-Config, a subset of codewords is selected. This is represented by the column "pertinent values of $i_2$" in TABLE 4-A and 4-B which provides a list of $N_B$ codewords, each of which is a function of the first PMI $i_1$ including $\{i_{1,1}, i_{1,2}\}$. Second, CSI calculation is performed as a function of the subset of $N_B$ codewords, in addition to channel measured from CSI-RS, where the function reflects the open-loop diversity operation utilized at the eNB. If precoder cycling is utilized, CSI calculation is performed assuming that the eNB performs a rank-v transmission using precoder cycling across the subset of $N_B$ precoders (where RI indicates rank-v recommendation).

For example, for rank-1 following the exemplary embodiment of TABLE 4-A, when codebook-Config is configured as 4 (which results in $N_B=4$), based on the pertinent $i_2$ values of $\{0, 4, 8, 12\}$, precoder subset of $\{W_{2i_{1,1},2i_{1,2},0}^{(1)}, W_{2i_{1,1}+1,2i_{1,2},0}^{(1)}, W_{2i_{1,1}+2,2i_{1,2},0}^{(1)}, W_{2i_{1,1}+3,2i_{1,2},0}^{(1)}\}$ is selected for precoder cycling. That is, the UE assumes that the eNB performs rank-1 open-loop diversity transmission across these four precoders. The resulting CQI is a function of the first PMI $i_1$ including $\{i_{1,1}, i_{1,2}\}$. Therefore, in addition to being conditioned on the reported RI and $i_1$ (including $\{i_{1,1}, i_{1,2}\}$), CQI calculation can also be done assuming transmission with a set of precoders corresponding to $i_2=\{0, 4, 8, 12\}$. In some UE implementations, the first PMI can be selected by the UE either before, after, or jointly with CQI (which depends on UE implementation). This corresponds to the transmission scheme described in Equation 7 or 8 (embodiment A.3) where precoder cycling is performed across DFT vectors within each polarization group.

For rank-1 and following the exemplary embodiment of TABLE 4-B, when codebook-Config is configured as 4, based on the pertinent $i_2$ values of $\{0, 1, 2, \ldots, 14, 15\}$, precoder subset of $$\left\{\begin{array}{cccc} W_{2i_{1,1},2i_{1,2},0}^{(1)}, & W_{2i_{1,1},2i_{1,2},1}^{(1)}, & W_{2i_{1,1},2i_{1,2},2}^{(1)}, & W_{2i_{1,1},2i_{1,2},3}^{(1)}, \\ W_{2i_{1,1}+1,2i_{1,2},0}^{(1)}, & W_{2i_{1,1}+1,2i_{1,2},1}^{(1)}, & W_{2i_{1,1}+1,2i_{1,2},2}^{(1)}, & W_{2i_{1,1}+1,2i_{1,2},3}^{(1)}, \\ W_{2i_{1,1}+2,2i_{1,2},0}^{(1)}, & W_{2i_{1,1}+1,2i_{1,2},1}^{(1)}, & W_{2i_{1,1}+1,2i_{1,2},2}^{(1)}, & W_{2i_{1,1}+1,2i_{1,2},3}^{(1)}, \\ W_{2i_{1,1}+3,2i_{1,2},0}^{(1)}, & W_{2i_{1,1}+3,2i_{1,2},1}^{(1)}, & W_{2i_{1,1}+3,2i_{1,2},2}^{(1)}, & W_{2i_{1,1}+3,2i_{1,2},3}^{(1)} \end{array}\right\}$$

is selected for precoder cycling. That is, the UE assumes that the eNB performs rank-1 open-loop diversity transmission across these $4N_B=16$ precoders. The resulting CQI is also a function of the first PMI $i_1$ including $\{i_{1,1}, i_{1,2}\}$. Therefore, in addition to being conditioned on the reported RI and $i_1$ (including $\{i_{1,1}, i_{1,2}\}$), CQI calculation can also be done assuming transmission with a set of precoders corresponding to $i_2=\{0, 1, \ldots, 15\}$. In some UE implementations, the first PMI can be selected by the UE either before, after, or jointly with CQI (which depends on UE implementation). This corresponds to the transmission scheme described in Equation 10 (embodiment A.4) where precoder cycling is performed across DFT vectors within each polarization group as well as co-phasing across two polarization groups.

The above descriptions can be extended to other values of codebook-Config.

Therefore, the UE reports its recommendation for the first PMI $i_1$ (which can include $\{i_{1,1}, i_{1,2}\}$) and its associated RI and CQI.

This procedure can be extended to ranks other than 1.

TABLE 4-A

Exemplary precoder cycling

| codebook-Config | Rank | Range of $i_{11}$ | Range of $i_{12}$ | Pertinent values of $i_2$ |
| --- | --- | --- | --- | --- |
| 1 | 1 | $0, 1, \ldots, N_1 o_1 - 1$ | $0, 1, \ldots, N_2 o_2 - 1$ | 0 |
| 2 | 1 | $0, 1, \ldots, \frac{N_1 o_1}{2} - 1$ | $0, 1, \ldots, \frac{N_2 o_2}{2} - 1$ | 0, 4, 8, 12 |
| 3 | 1 | $0, 1, \ldots, \frac{N_1 o_1}{2} - 1$ | $0, 1, \ldots, \frac{N_2 o_2}{2} - 1$ | 0, 4, 8, 12 |
| 4 | 1 | $0, 1, \ldots, \frac{N_1 o_1}{2} - 1$ | $0, 1, \ldots, \frac{N_2 o_2}{2} - 1$ | 0, 4, 8, 12 |

TABLE 4-B

Exemplary precoder cycling

| codebook-Config | Rank | Range of $i_{11}$ | Range of $i_{12}$ | Pertinent values of $i_2$ |
| --- | --- | --- | --- | --- |
| 1 | 1 | $0, 1, \ldots, N_1 o_1 - 1$ | $0, 1, \ldots, N_2 o_2 - 1$ | 0, 1, 2, 3 |
| 2 | 1 | $0, 1, \ldots, \frac{N_1 o_1}{2} - 1$ | $0, 1, \ldots, \frac{N_2 o_2}{2} - 1$ | 0, 1, 2, \ldots, 14, 15 |
| 3 | 1 | $0, 1, \ldots, \frac{N_1 o_1}{2} - 1$ | $0, 1, \ldots, \frac{N_2 o_2}{2} - 1$ | 0, 1, 2, \ldots, 14, 15 |

TABLE 4-B-continued

Exemplary precoder cycling

| codebook-Config | Rank | Range of $i_{11}$ | Range of $i_{12}$ | Pertinent values of $i_2$ |
|---|---|---|---|---|
| 4 | 1 | $0, 1, \ldots, \frac{N_1 o_1}{2} - 1$ | $0, 1, \ldots, \frac{N_2 o_2}{2} - 1$ | $0, 1, 2, \ldots, 14, 15$ |

In the above embodiments, the number of precoders per cycle is fixed for a given value of codebook-Config. Alternatively, a subset of all the available precoders can be utilized. For example, based on the embodiment in TABLE 4-B with codebook-Config=4, only four out of 16 precoders can be used per cycle, such as {0, 1, 8, 9}. A choice of subset can be predetermined based on the number of precoders or can be configured (hence signaled to a UE). This signaling of precoder subset can be performed either dynamically (e.g. via a DL control channel) or semi-statically (e.g. via higher-layer or RRC signaling). For the second option, a new RRC parameter indicating a set of $i_2$ values can be used either inside a CSI process configuration or CSI reporting configuration.

Since the first PMI is wideband (calculated assuming transmission on some or all of the set of S subbands), only CSI reporting modes that report wideband PMI are applicable.

For aperiodic CSI (A-CSI), only mode 3-1 is applicable. The first PMI ($i_1$ or $\{i_{1,1}, i_{1,2}\}$) is reported together with CQI and RI. This first PMI is calculated conditioned upon the most recent value of recommended rank in RI (which is the RI reported together with CQI and the first PMI) for the CSI process. The CQI is calculated conditioned upon the most recent value of recommended rank in RI (which is the RI reported together with CQI and the first PMI) for the CSI process, the most recent value of recommended first PMI (which is the first PMI reported together with CQI and RI) for the CSI process. For CQI calculation, a UE shall report one set of CQI values which represent channel quality for the first codeword, even when the recommended rank (RI) is greater than 1, but is calculated conditioned upon the reported RI and the reported first PMI $\{i_{1,1}, i_{1,2}\}$ for the CSI process.

While the above CSI calculation procedure suffices, at least one additional condition can also be introduced for CQI calculation to improve CSI accuracy as previously discussed. In one exemplary embodiment, CQI can also be calculated assuming transmission using an open-loop diversity scheme. In another exemplary embodiment, it can be further specified that CQI is calculated conditioned on the reported first PMI $\{i_{1,1}, i_{1,2}\}$ and a set of precoders associated with a set of $i_2$ values (such as the one given in TABLE 4-A or 4-B, or configured via higher-layer signaling). That is, CQI can also calculated assuming transmission using a set of precoders associated with a set of $i_2$ values.

For periodic (P-CSI), only mode 1-1 is applicable. The first PMI $i_1$ (which can include $\{i_{1,1}, i_{1,2}\}$) is calculated conditioned upon the most recent value of recommended rank in RI (which is the last reported periodic RI) for the CSI process. The CQI is calculated conditioned upon the most recent value of recommended rank in RI (which is the last reported periodic RI), the last reported periodic first PMI (which is reported either with RI or with CQI) for the CSI process. For CQI calculation, a UE shall report one set of CQI values which represent channel quality for the first codeword, even when the recommended rank (RI) is greater than 1, but is calculated conditioned upon the last reported periodic RI and the last reported periodic first PMI $\{i_{1,1}, i_{1,2}\}$ for the CSI process.

In this case, there are several options.

A first option is to report the first PMI $i_1$ (which can include $\{i_{1,1}, i_{1,2}\}$) in a same set of subframes as CQI (set 1) while RI is reported in a different set of subframes from CQI and the first PMI (set 2). In this first option, the first PMI can have a same or different periodicity from CQI while sharing the same subframe offset.

A second option is to report the first PMI $i_1$ (which can include $\{i_{1,1}, i_{1,2}\}$) in a set of subframes (set 1) while each of the CQI and RI is reported in a different set of subframes (set 2 and set 3, respectively). In this second option, the first PMI can have a same or different reporting configuration (subframe offset and periodicity) from CQI.

A third option is to report the first PMI $i_1$ (which can include $\{i_{1,1}, i_{1,2}\}$) in a same set of subframes as RI (set 1) while CQI is reported in a different set of subframes (set 2). In this third option, the first PMI can have a same or different periodicity from RI while sharing the same subframe offset. In all these three options, the first PMI $i_1$ (which can include $\{i_{1,1}, i_{1,2}\}$) is calculated conditioned upon the most recently reported RI—which can be reported in a same set of subframes.

Figure 7:
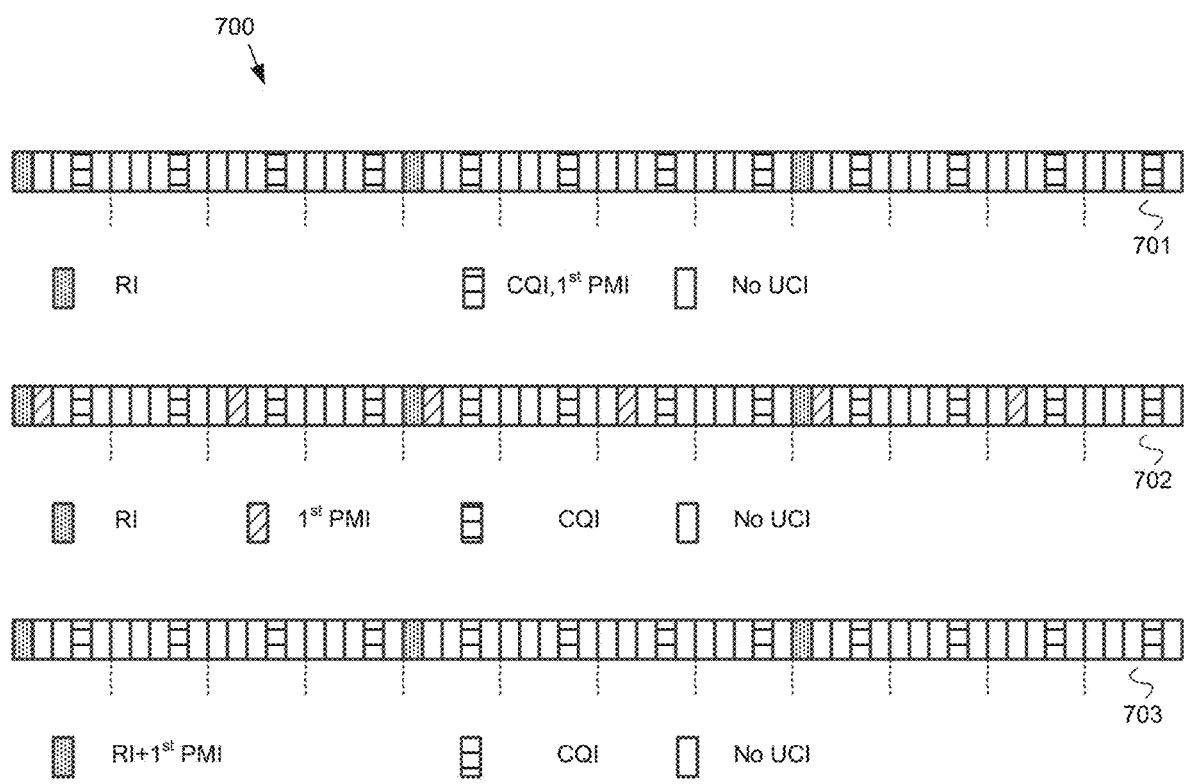
FIG. 7 illustrates an example of a periodic channel state information (CSI) reporting according to various embodiments of the present disclosure.

FIG. 7 illustrates these three options for P-CSI reporting in terms of an example UE reporting timing diagram 700. In 700, RI is assumed to be reported at 4 times longer interval compared to CQI. The top diagram 701 is an example of option 1 where the first PMI is reported together with CQI (thereby sharing the same periodicity and subframe offset). The middle diagram 702 is an example of option 2 where the first PMI is reported separately from CQI and RI. In this example, the first PMI is reported at half the interval of RI (and hence twice the interval of CQI). The bottom diagram 703 is an example of option 3 where the first PMI is reported together with RI (thereby sharing the same periodicity and subframe offset).

For all the above options, the possible values of RI can range from 1 to the maximum number of layers determined by UE capability. Alternatively, if the use of semi-open-loop transmission scheme is limited to rank-1 and 2, a 1-bit RI signaling suffices.

Another option which shares some features in the first and the second options configures a UE to report the first PMI $i_1$ (which can include $\{i_{1,1}, i_{1,2}\}$) in a same set of subframes as CQI (set 1) while RI is reported in a different set of subframes from CQI and the first PMI (set 2). However, the first PMI and CQI are not reported together since the reporting interval of the first PMI is an integer multiple H' (>1) of the reporting interval of CQI. Whenever the first PMI is to be reported (once every H' subframes containing CQI), CQI report is dropped. If the reporting instances for CQI can be described as $(10 \times n_f + \lfloor n_s/2 \rfloor - N_{OFFSET,CQI}) \mod (N_{pd}) = 0$, the reporting instances for the first PMI can be described as $(10 \times n_f + \lfloor n_s/2 \rfloor - N_{OFFSET,CQI}) \bmod (H \cdot N_{pd}) = 0$ In effect, this option allows CQI and the first PMI to be reported separately without having to introduce an additional subframe offset for reporting the first PMI.

Another option is possible when a large-capacity P-CSI reporting is available (such as PUCCH format 3 or periodic PUCCH format 4). In this embodiment, some or all the CSI parameters (CQI, the first PMI, and RI) are reported together in one subframe from a common set of subframes. In this embodiment, some or all CSI parameters share the same reporting instances: $(10 \times n_f + \lfloor n_s/2 \rfloor - N_{OFFSET,CQI}) \bmod (N_{pd}) = 0$.

The above description pertains to CSI reporting operation for class A CSI reporting or 'nonPrecoded' type. For class B CSI reporting or 'beamformed' type, the set of CSI reporting parameters depends on the number of CSI-RS resources configured for the UE. When K=1 CSI-RS resource is assigned to the UE, the first PMI $i_1$ (which can include $\{i_{1,1}, i_{1,2}\}$) is not needed if the eNB performs UE-specific beamforming on CSI-RS. Therefore, only CQI and RI associated with the beamformed CSI-RS ports measured by the UE are reported. Here, the CQI is calculated conditioned upon the reported RI (which can be either the last reported periodic RI or the reported RI in the same subframe) and the open-loop diversity scheme employed at the eNB.

In another embodiment (labeled embodiment B.2), an additional CSI reporting parameter which represents recommended co-phasing between two polarization groups is reported in conjunction with the CSI parameters in embodiment B.1. This co-phasing is reported together with the first PMI in embodiment B.1. The co-phasing can be defined and reported as a separate CSI parameter (for instance, a second PMI). Or the co-phasing can be reported as a part or an extension of the first PMI defined in embodiment B.1. Having received a UE recommendation for the first PMI and the co-phasing index, the eNB can perform open-loop diversity operation across $N_B$ codewords for each polarization group and co-phasing across the two polarization groups.

This recommended co-phasing can be defined similarly to $\varphi_n = e^{j\pi n/2}$ in TABLE 3-A, 3-B, 3-C, 3-D, and 3-E where four hypotheses $\{\pm 1, \pm j\}$ are used. Thus the total number of hypotheses for PMI reporting is increased by a factor of four.

This co-phasing can be reported either as a subband (calculated for each set S subband) or a wideband (calculated for some or all of the set of S subbands) CSI parameter. If the co-phasing is reported as a subband CSI parameter, the co-phasing can be defined and reported as a second PMI ($i_2$) separate from the first PMI ($i_{1,1}, i_{1,2}$). In this case, this second PMI can be configured with a same or a different reporting rate and subframe offset. If the co-phasing is reported as a wideband CSI parameter, the co-phasing can be defined and reported either as a second PMI or as a part of the first PMI $\{i_{1,1}, i_{1,2}\}$. In this case, this co-phasing recommendation is reported with a same update rate and subframe offset as the first PMI.

If the Rel.13 codebook table as described in TABLE 3-A to 3-E is to be utilized for the purpose of the present disclosure, an exemplary table can be defined as described in TABLE 5 below for rank 1. CSI calculation is then performed as follows. First, for a configured value of codebook-Config, a subset of codewords from the codebook is selected. This is represented by the column "pertinent values of $i_2$" in TABLE 5 which provides a list of $N_B$ codewords, each of which is a function of the first PMI $\{i_{1,1}, i_{1,2}\}$, as well as the co-phasing parameter n. Second, for each value of n, CSI calculation is performed as a function of the subset of $N_B$ codewords, in addition to channel measured from CSI-RS, where the function reflects the open-loop diversity operation utilized at the eNB. If precoder cycling is utilized, CSI calculation is performed assuming that the eNB performs a rank-v transmission using precoder cycling across the subset of $N_B$ precoders (where RI indicates rank-v recommendation).

For example, for rank-1, when codebook-Config is configured as 4, based on the pertinent $i_2$ values of n, n+4, n+8, n+12, precoder subset of $\{W_{2i_{1,1},2i_{1,2},n}^{(1)}, W_{2i_{1,1}+1,2i_{1,2},n}^{(1)}, W_{2i_{1,1}+2,2i_{1,2},n}^{(1)}, W_{2i_{1,1}+3,2i_{1,2},n}^{(1)}\}$ is selected for precoder cycling for a given $n \in \{0, 1, 2, 3\}$. That is, for a given value of n, the UE assumes that the eNB performs rank-1 open-loop diversity transmission across these four precoders. The resulting CQI is a function of the first PMI $\{i_{1,1}, i_{1,2}\}$ and the co-phasing index n. The recommended $\{i_{1,1}, i_{1,2}, n\}$ are selected by the UE either before, after, or jointly with CQI (which depends on UE implementation).

Therefore, the UE reports its recommendation for the first PMI $\{i_{1,1}, i_{1,2}\}$, co-phasing index n, and their associated RI and CQI.

This procedure can be extended to other codebook-Config values as well as ranks other than 1.

TABLE 5

Example precoder cycling

| codebook-Config | Rank | Range of $i_{11}$ | Range of $i_{12}$ | Pertinent values of $i_2$ for given $n \in \{0, 1, 2, 3\}$ |
|---|---|---|---|---|
| 1 | 1 | $0, 1, \ldots, N_1 o_1 - 1$ | $0, 1, \ldots, N_2 o_2 - 1$ | n |
| 2 | 1 | $0, 1, \ldots, \frac{N_1 o_1}{2} - 1$ | $0, 1, \ldots, \frac{N_2 o_2}{2} - 1$ | n, n + 4, n + 16, n + 20 |
| 3 | 1 | $0, 1, \ldots, \frac{N_1 o_1}{2} - 1$ | $0, 1, \ldots, \frac{N_2 o_2}{2} - 1$ | n, n + 8, n + 20, n + 28 |
| 4 | 1 | $0, 1, \ldots, \frac{N_1 o_1}{2} - 1$ | $0, 1, \ldots, \frac{N_2 o_2}{2} - 1$ | n, n + 4, n + 8, n + 12 |

Since the first PMI $\{i_{1,1}, i_{1,2}\}$ (or its composite) is wideband (calculated assuming transmission on some or all of the set of S subbands) and the co-phasing index n can be treated as wideband, only CSI reporting modes that report wideband PMI are applicable. In this case, a composite PMI which includes $\{i_{1,1}, i_{1,2}, n\}$ can be defined and reported as the PMI for this embodiment.

For aperiodic CSI (A-CSI), only mode 3-1 is applicable. The first PMI $i_1$ (which can include $\{i_{1,1}, i_{1,2}, n\}$) is reported together with CQI and RI. This first PMI $i_1$ (which can include $\{i_{1,1}, i_{1,2}, n\}$) is calculated conditioned upon the most recent value of recommended rank in RI (which is the RI reported together with CQI and the first PMI) for the CSI process. The CQI is calculated conditioned upon the most recent value of recommended rank in RI (which is the last reported periodic RI), the last reported periodic first PMI (which is reported either with RI or with CQI) for the CSI process. For CQI calculation, a UE shall report one set of CQI values which represent channel quality for the first codeword, even when the recommended rank (RI) is greater than 1, but is calculated conditioned upon the last reported periodic RI and the last reported periodic first PMI $i_1$ (which can include $\{i_{1,1}, i_{1,2}, n\}$) for the CSI process.

While the above CSI calculation procedure suffices, at least one additional condition can also be introduced for CQI calculation to improve CSI accuracy as previously discussed. In one exemplary embodiment, CQI can also calculated assuming transmission using an open-loop diversity scheme. In another exemplary embodiment, it can be further specified that CQI is calculated conditioned on the reported first PMI $i_1$ (which can include $\{i_{1,1}, i_{1,2}, n\}$) and a set of precoders associated with a set of $i_2$ values (such as the one given in TABLE 4B, or configured via higher-layer signaling). That is, CQI can also calculated assuming transmission using a set of precoders associated with a set of $i_2$ values.

For periodic (P-CSI), only mode 1-1 is applicable. The first PMI $i_1$ (which can include $\{i_{1,1}, i_{1,2}, n\}$) is calculated conditioned upon the most recent value of recommended rank in RI (which is the last reported periodic RI) for the CSI process. The CQI is calculated conditioned upon the most recent value of recommended rank in RI (which is the last reported periodic RI), the last reported periodic first PMI (which is reported either with RI or with CQI) for the CSI process. For CQI calculation, a UE shall report one set of CQI values which represent channel quality for the first codeword, even when the recommended rank (RI) is greater than 1, but is calculated conditioned upon the last reported periodic RI and the last reported periodic first PMI $i_1$ (which can include $\{i_{1,1}, i_{1,2}, n\}$) for the CSI process.

While the above CSI calculation procedure suffices, at least one additional condition can also be introduced for CQI calculation to improve CSI accuracy as previously discussed. In one exemplary embodiment, CQI can also calculated assuming transmission using an open-loop diversity scheme. In another exemplary embodiment, it can be further specified that CQI is calculated conditioned on the reported first PMI $i_1$ (which can include $\{i_{1,1}, i_{1,2}, n\}$) and a set of precoders associated with a set of $i_2$ values (such as the one given in TABLE 4B, or configured via higher-layer signaling). That is, CQI can also calculated assuming transmission using a set of precoders associated with a set of $i_2$ values.

In this case, there are several options.

A first option is to report $\{i_{1,1}, i_{1,2}, n\}$ (or its composite) in a same set of subframes as CQI (set 1) while RI is reported in a different set of subframes from CQI and $\{i_{1,1}, i_{1,2}, n\}$ (set 2). In this first option, the first PMI can have a same or different periodicity from CQI while sharing the same subframe offset.

A second option is to report $\{i_{1,1}, i_{1,2}, n\}$ (or its composite) in a set of subframes (set 1) while each of the CQI and RI is reported in a different set of subframes (set 2 and set 3, respectively). In this second option, $\{i_{1,1}, i_{1,2}, n\}$ (or its composite) can have a same or different reporting configuration (subframe offset and periodicity) from CQI.

A third option is to report $\{i_{1,1}, i_{1,2}, n\}$ (or its composite) in a same set of subframes as RI (set 1) while CQI is reported in a different set of subframes (set 2). In this third option, $\{i_{1,1}, i_{1,2}, n\}$ (or its composite) can have a same or different periodicity from RI while sharing the same subframe offset. In all these three options, $\{i_{1,1}, i_{1,2}, n\}$ (or its composite) is calculated conditioned upon the most recently reported periodic RI—which can be reported in a same set of subframes.

An exemplary timing diagram is similar to that given in FIG. 7, following embodiment B.1.

Another embodiment which shares some features in the first and the second options configures a UE to report the first PMI ($\{i_{1,1}, i_{1,2}, n\}$ or its composite in a same set of subframes as CQI (set 1) while RI is reported in a different set of subframes from CQI and the first PMI (set 2). However, the first PMI and CQI are not reported together since the reporting interval of the first PMI is an integer multiple H' (>1) of the reporting interval of CQI. Whenever the first PMI is to be reported (once every H' subframes containing CQI), CQI report is dropped. If the reporting instances for CQI can be described as $(10 \times n_f + \lfloor n_s/2 \rfloor - N_{OFFSET,CQI}) \mod (N_{pd}) = 0$, the reporting instances for the first PMI can be described as $(10 \times n_f + \lfloor n_s/2 \rfloor - N_{OFFSET,CQI}) \mod (H' \cdot N_{pd}) = 0$. In effect, this option allows CQI and the first PMI to be reported separately without having to introduce an additional subframe offset for reporting the first PMI.

Another embodiment is possible when a large-capacity P-CSI reporting is available (such as PUCCH format 3 or periodic PUSCH format 4). In this embodiment, some or all the CSI parameters (CQI, the first PMI, and RI) are reported together in one subframe from a common set of subframes. In this embodiment, some or all CSI parameters share the same reporting instances: $(10 \times n_f + \lfloor n_s/2 \rfloor - N_{OFFSET,CQI}) \mod (N_{pd}) = 0$.

The above description pertains to CSI reporting operation for class A CSI reporting or 'nonPrecoded' type. For class B CSI reporting or 'beamformed' type, the set of CSI reporting parameters depends on the number of CSI-RS resources configured for the UE. When K=1 CSI-RS resource is assigned to the UE, $\{(i_{1,1}, i_{1,2}, n\}$ is not needed if the eNB performs UE-specific beamforming on CSI-RS. Therefore, only CQI, RI, and co-phasing recommendation $\{k\}$ associated with the beamformed CSI-RS ports measured by the UE are reported. Here, the CQI is calculated conditioned upon the value of RI, the open-loop diversity scheme employed at the eNB, and the recommended value of co-phasing index $\{k\}$.

In another embodiment (labeled embodiment B.3), a codebook subset selection reporting is reported in addition to the other CSI reporting parameters. In embodiment B.1 and B.2, it is assumed that an eNB configures a UE via higher-layer signaling with a codebook subset selection. In an exemplary scheme based on the Rel.13 codebook tables as described in TABLE 3-A, 3-B, 3-C, 3-D, and 3-E, this configuration is done using RRC parameter codebook-Config, as also evident in TABLE 4-A, 4-B, or 5. In this embodiment, an additional CSI reporting parameter which recommends a codebook subset selection is reported by a UE. This subset selection indicator (abbreviated as SSI, for example) is a separate parameter from and hence can be reported concurrently with CQI, PMI (including the first PMI and/or co-phasing indicator), and/or RI. Therefore embodiment B.3 can be used in conjunction with embodiment B.1 and/or B.2.

Since codebook subset selection varies slowly, codebook subset selection is reported at a considerably lower update rate than CQI, PMI, and/or RI. In addition, codebook subset selection is a wideband (calculated for some or all of the set of S subbands) reporting. In this case, a UE can utilize an estimate of long-term channel profiles such as channel covariance matrix or AoD profile. Such long-term channel profiles can be estimated from CSI measurements over multiple subframes. Upon receiving a subset recommendation from a UE, an eNB, taking the SSI reporting into account, configures the UE with a codebook subset selection via, for example, RRC parameter codebook-Config.

For PUSCH-based A-CSI reporting, SSI can be triggered or requested separately from the other CSI parameters by the eNB. Therefore, the UE only reports SSI when SSI reporting is requested by the eNB. An additional CSI request hypothesis is needed for this purpose. Alternatively, SSI can always be reported together with the other CSI parameters (CQI, PMI, and/or RI). In this case, no additional hypothesis for SSI request is required.

For PUCCH-based P-CSI reporting, SSI is assigned its own reporting configuration which includes periodicity (update rate) and/or subframe offset. A sub-embodiment can be devised by restricting SSI reporting either in the same set or in a subset of subframes used for RI reporting. In this case, SSI reporting only requires a separate periodicity configuration. Subframe offset is not needed since SSI, whenever reported, is reported together with RI.

The above description pertains to CSI reporting operation for class A CSI reporting or 'nonPrecoded' type. For class B CSI reporting or 'beamformed' type, the set of CSI reporting parameters depends on the number of CSI-RS resources configured for the UE. When K=1 CSI-RS resource is assigned to the UE, $\{i_{1,1}, i_{1,2}\}$ is not needed if the eNB performs UE-specific beamforming on CSI-RS. Therefore, only CQI, RI and, in case of embodiment B.2, co-phasing recommendation $\{k\}$, associated with the beamformed CSI-RS ports measured by the UE are reported in conjunction with SSI. Here, the CQI is calculated conditioned upon the value of RI, the open-loop diversity scheme employed at the eNB, and, in case of embodiment B.2, the recommended value of co-phasing index $\{k\}$. To utilize SSI for beamformed CSI-RS, however, a UE shall be configured to receive and measure both non-precoded and UE-specific beamformed CSI-RS. Non-precoded CSI-RS (associated with class A CSI reporting) is needed to calculate SSI.

In another embodiment (labeled embodiment B.4), a channel profile indicator is reported in addition to other CSI reporting parameters. In embodiment B.1 and B.2, it is assumed that an eNB configures a UE via higher-layer signaling with a codebook subset selection. In an exemplary scheme based on the Rel.13 codebook tables as described in TABLE 3-A, 3-B, 3-C, 3-D, and 3-E, this configuration is done using RRC parameter codebook-Config—as also evident in TABLE 4-A, 4-B, or 5. In addition, in embodiment B.3, a codebook subset selection indicator (abbreviated as SSI, for example) which recommends a codebook subset selection is reported. To calculate SSI, a UE can utilize an estimate of long-term channel profiles such as channel covariance matrix or AoD profile. Such long-term channel profiles can be estimated from CSI measurements over multiple subframes. In this embodiment, an additional CSI reporting parameter which indicates long-term DL channel profile parameters such as AoD spread (for instance, quantized value of AoD span or a quantized range of AoD values, along with the relative strength or magnitude of each quantized AoD) is reported. This channel profile indicator (CPI) can be calculated by a UE from CSI measurements over multiple subframes. Therefore, embodiment B.4 can be an alternative to embodiment B.3. Just as embodiment B.3, embodiment B.4 can be used in conjunction with embodiment B.1 and/or B.2.

Upon receiving a CPI report from a UE, an eNB, taking the CPI reporting into account, configures the UE with a codebook subset selection via, for example, RRC parameter codebook-Config.

Similar to embodiment B.3, for PUSCH-based A-CSI reporting, CPI can be triggered or requested separately from the other CSI parameters by the eNB. Therefore, the UE only reports CPI when CPI reporting is requested by the eNB. An additional CSI request hypothesis is needed for this purpose. Alternatively, CPI can always be reported together with the other CSI parameters (CQI, PMI, and/or RI). In this case, no additional hypothesis for CPI request is required.

Similar to embodiment B.3, for PUCCH-based P-CSI reporting, CPI is assigned its own reporting configuration which includes periodicity (update rate) and/or subframe offset. A sub-embodiment can be devised by restricting CPI reporting either in the same set or in a subset of subframes used for RI reporting. In this case, CPI reporting only requires a separate periodicity configuration. Subframe offset is not needed since CPI, whenever reported, is reported together with RI.

The above description pertains to CSI reporting operation for class A CSI reporting or 'nonPrecoded' type. For class B CSI reporting or 'beamformed' type, the set of CSI reporting parameters depends on the number of CSI-RS resources configured for the UE. When K=1 CSI-RS resource is assigned to the UE, $\{i_{1,1}, i_{1,2}\}$ is not needed if the eNB performs UE-specific beamforming on CSI-RS. Therefore, only CQI, RI and, in case of embodiment B.2, co-phasing recommendation $\{k\}$, associated with the beamformed CSI-RS ports measured by the UE are reported in conjunction with CPI. Here, the CQI is calculated conditioned upon the value of RI, the open-loop diversity scheme employed at the eNB, and, in case of embodiment B.2, the recommended value of co-phasing index $\{k\}$. To utilize CPI for beamformed CSI-RS, however, a UE shall be configured to receive and measure both non-precoded and UE-specific beamformed CSI-RS. Non-precoded CSI-RS (associated with class A CSI reporting) is needed to calculate CPI.

In another embodiment (labeled embodiment B.5), quantized channel covariance matrix is reported in addition to other CSI reporting parameters. From the quantized channel covariance matrix, SSI or CPI can be calculated or derived. To report this CSI entity, larger amount of feedback resource is needed. Just as embodiment B.3 or B.4, embodiment B.5 can be used in conjunction with embodiment B.1 and/or B.2. Such long-term channel profiles can be estimated from CSI measurements over multiple subframes.

For the third component (that is, codebook for CSI reporting), when the reported RI is 1 (whether the last reported periodic RI for P-CSI or the RI reported together with CQI and PMI for A-CSI), rank-1 codebook for Rel.13 CLASS A eMIMO-Type can be utilized.

For supporting higher-rank semi-open-loop diversity transmission, at least two different embodiments apply.

In one embodiment (labeled embodiment C.1), the same rank-1 codebook from Rel.13 CLASS A design is used for rank-v CSI reporting where v≥1. In particular, the PMI calculation schemes in embodiment B.1 and B.2 are extended to support RI=v>1, thus transmission across multiple layers. If precoder cycling is used at an eNB, a same set of precoding vectors per polarization group (associated with the first PMI $\{i_{1,1}, i_{1,2}\}$ and codebook subset selection) is used to transmit multiple layers of data while different precoder cycling patterns are used for different layers. Likewise, transmissions to a plurality of UEs can be multiplexed together within a set of $N_B$ or $KN_B$ precoders (per polarization group) by assigning different precoder cycling patterns for different UEs. Association between a UE and its precoder cycling pattern(s) can be done using at least one UE-specific parameter (such as Cell Radio Network Temporary Identifier (C-RNTI) and/or PRB allocation).

In another embodiment (labeled embodiment C.2), the rank-v codebook from Rel.13 class A design for rank-v CSI reporting, either the first PMI in embodiment B.1 $\{i_{1,1}, i_{1,2}\}$, or the first PMI with co-phasing recommendation in embodiment B.2 $\{i_{1,1}, i_{1,2}, n\}$). If precoder cycling is used at an eNB, a different set of precoding vectors per polarization group (associated with the first PMI $\{i_{1,1}, i_{1,2}\}$ and codebook subset selection) can be different for different ranks, including the number of beams per polarization group. Just as embodiment C.1, transmissions to a plurality of UEs can be multiplexed together within a set of $N_B$ or $KN_B$ precoders (per polarization group) by assigning different precoder cycling patterns for different UEs. Association between a UE and its precoder cycling pattern(s) can be done using at least one UE-specific parameter (such as C-RNTI and/or PRB allocation).

For the above embodiments, a UE can be configured with a DL transmission scheme which utilizes open-loop diversity operation (such as precoder cycling). This configuration can be signaled to the UE either via higher-layer signaling or L1/L2 signaling (e.g. MAC control element or DL-related DCI). For instance, if higher-layer signaling is used, a UE receives an RRC parameter (e.g. OpenLoop-Enabled) which indicates transmission scheme configuration. If the value of the RRC parameter represents the open-loop diversity transmission, the UE calculates its CSI parameters (such as RI, the first PMI, and/or CQI) according to this configuration. In addition, the UE receives and demodulates data transmission assuming the open-loop diversity operation such as precoder cycling.

Alternatively, instead of DL transmission scheme configuration, CSI-related configuration can also be used if such a semi-open-loop or open-loop diversity transmission is implemented in a UE-transparent manner. In this case, the UE receives and demodulates a DL transmission in a same manner as a DMRS-based precoded transmission. But the UE calculates and reports CSI according to the CSI-related configuration.

Figure 8:
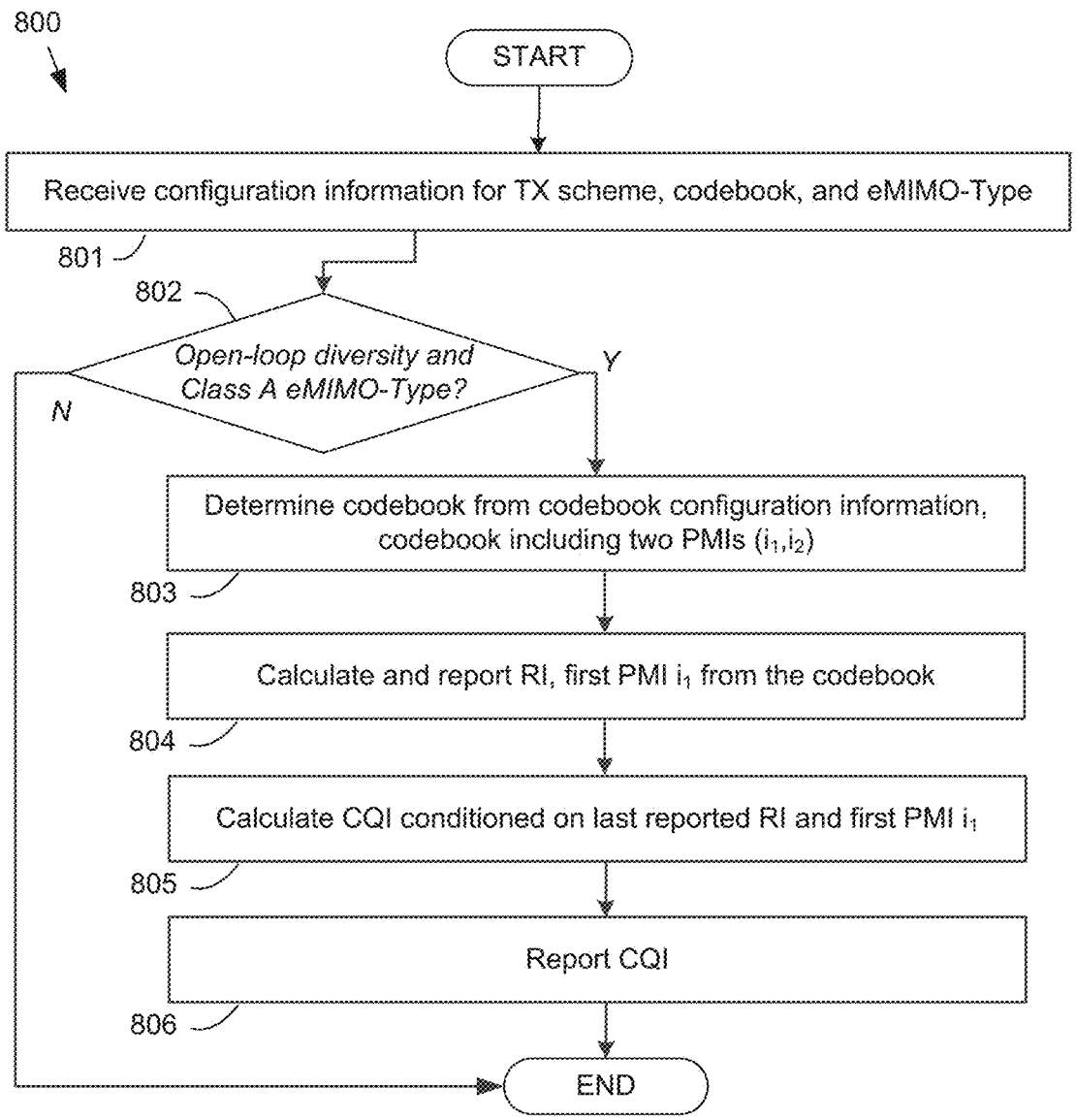
FIG. 8 illustrates a flowchart for an example method wherein a UE receives configuration information and calculates CSI report according to an embodiment of the present disclosure.

FIG. 8 illustrates a flowchart for an example method 800 wherein a UE receives configuration information and calculates CSI report according to an embodiment of the present disclosure. For example, the method 800 can be performed by the UE 116.

The method 800 begins with the UE receiving configuration information for transmission scheme, codebook, and eMIMO-Type (step 801). If the transmission scheme configuration indicates open-loop diversity and the eMIMO-Type configuration indicates Class A (step 802), the UE first determines a codebook used for CSI calculation from the codebook configuration information (step 803). This codebook includes two PMIs $\{i_1, i_2\}$. The first PMI $i_1$ can include two codebook indices $\{i_{1,1}, i_{1,2}\}$. From this codebook, the UE calculates RI and the first PMI $i_1$ where the first PMI is calculated conditioned on the last reported RI which can be reported in a same subframe as the first PMI (step 804). A CQI is then calculated conditioned on the last reported RI and the first PMI $i_1$. Depending on the open-loop diversity scheme, CQI calculation can be done assuming transmission with cycling across a plurality of precoders associated with the first PMI $i_1$ (step 805). The RI, first PMI $i_1$, and CQI are then reported on an uplink channel (step 806).

Figure 9:
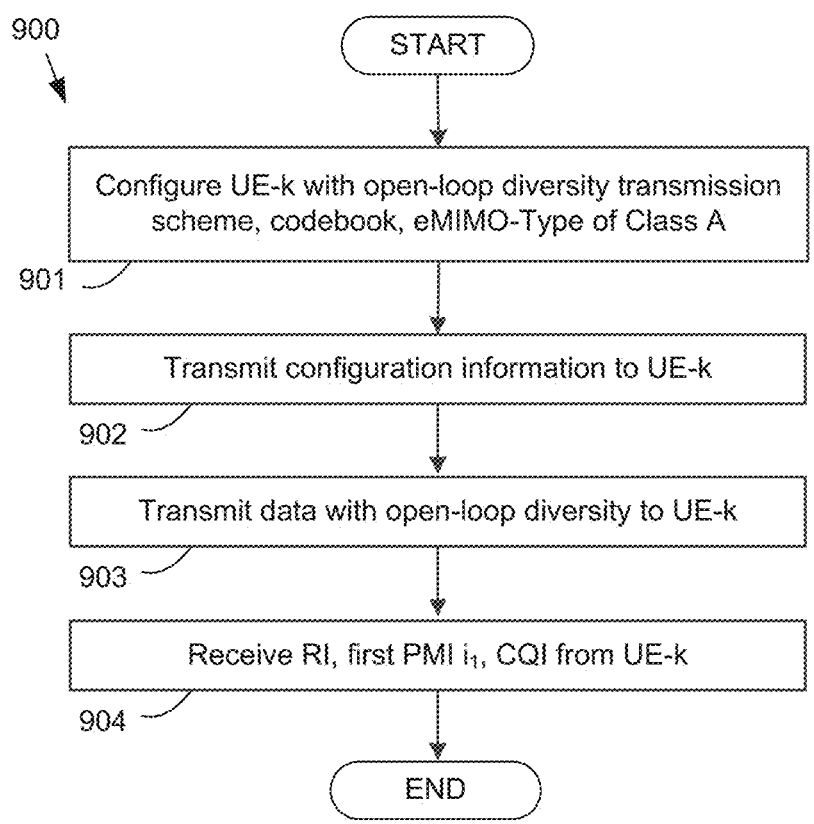
FIG. 9 illustrates a flowchart for an example method wherein an eNB configures a UE (labeled as UE-k) with transmission scheme, a codebook setting, and eMIMO-Type according to various embodiments of the present disclosure.

FIG. 9 illustrates a flowchart for an example method 900 wherein an eNB configures a UE (labeled as UE-k) with transmission scheme, a codebook setting, and eMIMO-Type according to an embodiment of the present disclosure. For example, the method 900 can be performed by the eNB 102.

The method 900 begins with the eNB configures a UE (labeled as UE-k) with open-loop diversity transmission scheme, a codebook setting, and eMIMO-Type of Class A (step 901). The eNB transmits this configuration information (step 902) as well as data with open-loop diversity to UE-k (step 903). An example of an open-loop transmit diversity is to perform precoder cycling operation in frequency domain. That is, the data is transmitted with a precoder wherein the precoder is taken from a small set/subset and varied across frequency sub-carriers or groups of frequency sub-carriers. The eNB also receives a CSI report from UE-k which includes RI, first PMI $i_1$, and CQI (step 904) wherein the first PMI $i_1$ is calculated from a two-PMI codebook determined by the codebook configuration information.

Although FIGS. 8 and 9 illustrate examples of methods for receiving configuration information and configuring a UE, respectively, various changes could be made to FIGS. 8 and 9. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE) comprising:
a transceiver configured to receive a configuration signal for selecting a transmission scheme, a codebook setting, and a reporting mechanism; and
a processor operably connected to the transceiver, the processor configured to calculate, in response to receipt of the configuration signal for selecting the codebook setting and the reporting mechanism and identifying that the transmission scheme indicates an open-loop diversity operation, a first precoding matrix indicator (PMI) $i_1$ from a codebook;
wherein the codebook includes two PMIs $i_1$ and $i_2$ and is determined based on the codebook setting;
wherein the reporting mechanism indicates a reporting of at least the first PMI $i_1$;
wherein the first PMI $i_1$ includes at least two codebook indices $i_{1,1}$ and $i_{1,2}$; and
wherein the transceiver is further configured to report only the first PMI $i_1$ from among the two PMIs by transmitting the first PMI $i_1$ on an uplink channel.

2. The UE of claim 1, wherein:
the processor is further configured to calculate a rank indicator (RI) and channel quality indicator (CQI) wherein the first PMI $i_1$ is calculated conditioned on a last reported RI; and
the transceiver is further configured to report the RI and CQI by transmitting the RI and the CQI on the uplink channel.

3. The UE of claim 2, wherein the CQI is calculated conditioned on the last reported RI and a last reported first PMI $i_1$.

4. The UE of claim 2, wherein the CQI is calculated conditioned on the last reported RI and assuming a downlink transmission with cycling across at least two precoders from the codebook associated with a last reported first PMI $i_1$.

5. The UE of claim 2, wherein the transceiver is further configured to report a codebook configuration indicator.

6. A base station (BS) comprising:
 a processor configured to:
  generate a configuration signal to configure a user equipment (UE) for selecting a transmission scheme, a codebook setting, and a reporting mechanism; and
 a transceiver operably connected to the processor, the transceiver configured to:
  transmit, to the UE, the configuration signal;
  transmit, to the UE, data with open-loop diversity; and
  receive a report including a first precoding matrix indicator (PMI) $i_1$ on an uplink channel;
 wherein the first PMI $i_1$ is calculated from a codebook that includes two PMIs $i_1$ and $i_2$ and is determined based on the codebook setting,
 wherein the reporting mechanism indicates a reporting of at least first PMI $i_1$, and
 wherein the first PMI $i_1$ includes at least two codebook indices $i_{1,1}$ and $i_{1,2}$.

7. The BS of claim 6, wherein:
 the transceiver is further configured to receive a rank indicator (RI) and channel quality indicator (CQI) on the uplink channel, and
 the first PMI $i_1$ is calculated conditioned on a last reported RI.

8. The BS of claim 7, wherein the CQI is calculated conditioned on the last reported RI and a last reported first PMI $i_1$.

9. The BS of claim 7, wherein the CQI is calculated conditioned on the last reported RI and assuming a downlink transmission with cycling across at least two precoders from the codebook associated with a last reported first PMI $i_1$.

10. The BS of claim 7, wherein the transceiver is configured to transmit the data with open-loop diversity based on transmission of the data across at least two precoders cycled in frequency domain.

11. A method for operating a user equipment (UE), the method comprising:
 receiving, by the UE, a configuration signal for selecting a transmission scheme, a codebook setting, and a reporting mechanism;
 in response to receipt of the configuration signal for selecting the codebook setting and the reporting mechanism and identifying that the transmission scheme indicates an open-loop diversity operation, calculating, by the UE, a first precoding matrix indicator (PMI) $i_1$ from a codebook that is determined based on the codebook setting and includes two PMIs $i_1$ and $i_2$; and
 reporting only the first PMI $i_1$ from among the two PMIs by transmitting the first PMI $i_1$ on an uplink channel,
 wherein the reporting mechanism indicates a reporting of at least first PMI $i_1$, and
 wherein the first PMI $i_1$ includes at least two codebook indices $i_{1,1}$ and $i_{1,2}$.

12. The method of claim 11, further comprising:
 calculating a rank indicator (RI) and channel quality indicator (CQI) wherein the first PMI $i_1$ is calculated conditioned on a last reported RI; and
 reporting the RI and CQI by transmitting the RI and the CQI on the uplink channel.

13. The method of claim 12, wherein the CQI is calculated conditioned on the last reported RI and a last reported first PMI $i_1$.

14. The method of claim 12, wherein the CQI is calculated conditioned on the last reported RI and assuming a downlink transmission with cycling across at least two precoders from the codebook associated with a last reported first PMI $i_1$.

15. The method of claim 12, further comprising reporting a codebook configuration indicator.

* * * * *